US011580203B2

(12) United States Patent
Chen et al.

(10) Patent No.: US 11,580,203 B2
(45) Date of Patent: Feb. 14, 2023

(54) METHOD AND APPARATUS FOR AUTHENTICATING A USER OF A COMPUTING DEVICE

(71) Applicant: Arizona Board of Regents on behalf of Arizona State University, Scottsdale, AZ (US)

(72) Inventors: Yimin Chen, Tempe, AZ (US); Yanchao Zhang, Phoenix, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 848 days.

(21) Appl. No.: 16/396,552

(22) Filed: Apr. 26, 2019

(65) Prior Publication Data
US 2019/0332757 A1    Oct. 31, 2019

Related U.S. Application Data

(60) Provisional application No. 62/664,844, filed on Apr. 30, 2018.

(51) Int. Cl.
*G06F 21/32* (2013.01)
*G06K 9/62* (2022.01)
(Continued)

(52) U.S. Cl.
CPC .......... *G06F 21/32* (2013.01); *G06K 9/6201* (2013.01); *G06V 10/30* (2022.01); *G06V 10/56* (2022.01);
(Continued)

(58) Field of Classification Search
CPC combination set(s) only.
See application file for complete search history.

(56) References Cited

U.S. PATENT DOCUMENTS 7,436,988 B2   10/2008  Zhang et al.
9,642,543 B2    5/2017  Banerjee et al.
(Continued)

OTHER PUBLICATIONS

Asthana, A., et al., "Incremental Face Alignment in the Wild," IEEE CVPR'14, (Jun. 2014), 8 pages.
(Continued)

*Primary Examiner* — James M Anderson, II
(74) *Attorney, Agent, or Firm* — Elliott, Ostrander & Preston, P.C.

(57) ABSTRACT

A system for authenticating a user attempting to access a computing device or a software application executing thereon. A data storage device stores one or more digital images or frames of video of face(s) of authorized user(s) of the device. The system subsequently receives from a first video camera one or more digital images or frames of video of a face of the user attempting to access the device and compares the image of the face of the user attempting to access the device with the stored image of the face of the authorized user of the device. To ensure the received video of the face of the user attempting to access the device is a real-time video of that user, and not a forgery, the system further receives a first photoplethysmogram (PPG) obtained from a first body part (e.g., a face) of the user attempting to access the device, receives a second PPG obtained from a second body part (e.g., a fingertip) of the user attempting to access the device, and compares the first PPG with the second PPG. The system authenticates the user attempting to access the device based on a successful comparison of (e.g., correlation between, consistency of) the first PPG and the second PPG and based on a successful comparison of the image of the face of the user attempting to access the device with the stored image of the face of the authorized user of the device.

20 Claims, 15 Drawing Sheets

(51) Int. Cl.
| | |
|---|---|
| H04N 5/225 | (2006.01) |
| H04N 5/247 | (2006.01) |
| G06V 10/30 | (2022.01) |
| G06V 10/56 | (2022.01) |
| G06V 40/40 | (2022.01) |
| G06V 40/70 | (2022.01) |
| G06V 40/16 | (2022.01) |
| G06V 40/10 | (2022.01) |

(52) U.S. Cl.
CPC ............ *G06V 40/172* (2022.01); *G06V 40/45* (2022.01); *G06V 40/70* (2022.01); *H04N 5/2256* (2013.01); *H04N 5/247* (2013.01); *G06V 40/15* (2022.01)

(56) References Cited

U.S. PATENT DOCUMENTS

| 9,842,891 | B2 | 12/2017 | Yeh et al. | |
|---|---|---|---|---|
| 62,666,049 | | 5/2018 | Zhang | |
| 2015/0264567 | A1* | 9/2015 | Sensharma | G06V 10/17 455/411 |
| 2018/0303351 | A1* | 10/2018 | Mestha | A61B 5/0077 |
| 2019/0003421 | A1 | 4/2019 | Zhang | |
| 2019/0209052 | A1* | 7/2019 | Jeanne | G06V 40/164 |
| 2019/0332757 | A1 | 10/2019 | Chen et al. | |
| 2019/0342103 | A1 | 11/2019 | Zhang et al. | |
| 2019/0362064 | A1 | 11/2019 | Zhang et al. | |
| 2020/0034566 | A1 | 1/2020 | Zhang et al. | |

OTHER PUBLICATIONS

Bishop, C., "Pattern Recognition and Machine Learning," Springer, (2006), 66 pages.
Chen, S., et al., "Sensor-Assisted Facial Recognition: an Enhanced Biometric Authentication System for Smartphones," ACM MobiSys'14, (Jun. 2014), 14 pages.
Chen, Y. et al., "Your Face Your Heart: Secure Mobile Face Authentication with Photoplethysmograms," IEEE Infocom 2017—IEEE Conference on Computer Communications (2017), 9 pages.
Chen, Y., et al., "Your Song Your Way: Rhythm-Based Two-Factor Authentication for Multi-Touch Mobile Devices," IEEE INFOCOM'15, (Apr.-May 2015), 9 pages.
Friedman, N., et al., "Bayesian Network Classifiers," Machine Learning, vol. 29, No. 2-3, (1997), pp. 131-163.
Ghiass, R., et al., "Infared Face Recognition: a Literature Review," IEEE IJCNN'13, (Aug. 2013), 10 pages.
Gregoski, M., et al., "Development and Validation of a Smartphone Heart Rate Acquisition Application for Health Promotion and Wellness Telehealth Applications," International Journal of Telemedicine and Applications, vol. 2012, (2012), 7 pages.
Hall, M. et al., "The WEKA Data Mining Software: An Update," ACM SIGKDD Explorations Newsletter, vol. 11, No. 1, (2009), pp. 10-18.
Hanley, J., et al., "The Meaning and Use of the Area Under a Receiver Operating Characteristic (ROC) Curve," Radiology, vol. 143, No. 1, 1982, pp. 29-36.
Haykin, S., "A Comprehensive Foundation," Neural Networks, vol. 2, Chapter 4 (2004), 100 pages.
Haykin, S., et al., "Least-Mean-Square Adaptive Filters," John Wiley & Sons, vol. 31, (2003), 11 pages.
Hom, E., "Mobile Device Security: Startling Statistics on Data Loss and Data Breaches," Channel Pro Network, https://www.channelpronetwork.com/article/mobile-device-security-startling-statistics-data-loss-and-data-breaches.

http://resources.alcatel-lucent.com/asset/189669, Retrieved on Feb. 18, 2020, 17 pages.
https://i-msdn.sec.s-msft.com/dynmig/IC584331.png, Retrieved on Feb. 18, 2020, 1 page.
Kähm, O., et al., "2D Face Liveness Detection: an Overview," IEEE BIOSIG'12, (Sep. 2012), pp. 171-182.
Kollreider, K., et al., "Non-intrusive liveness detection by face images," Image and Vision Computing, vol. 27, No. 3, (Feb. 2009), pp. 233-244.
Kumar, M., et al., "DistancePPG: Robust non-contact vital signs monitoring using a camera," Biomedical optics express, vol. 6, No. 5, (May 2015), pp. 1565-1588.
Lam, A., et al., "Robust Heart Rate Measurement from Video Using Select Random Patches," IEEE CVPR'15, (Dec. 2015), pp. 3640-3648.
Lewandowska, M., et al., "Measuring Pulse Rate with a Webcam—a Non-contact Method for Evaluating Cardiac Activity," IEEE FedCSIS'11, (Sep. 2011), pp. 405-410.
Li, L., et al., "Unobservable Re-authentication for Smartphones," NDSS'13, (Feb. 2013), 16 pages.
Li, T., et al., "iLock: Immediate and Automatic Locking of Mobile Devices Against Data Theft," ACM CCS'16, (Oct. 2016), pp. 933-944.
Li, X., et al., "Remote Heart Rate Measurement from Face Videos Under Realistic Situations," IEEE CVPR'14, (Jun. 2014), pp. 4321-4328.
Li, Y., et al., "Seeing Your Face is Not Enough: An Inertial Sensor-Based Liveness Detection for Face Authentication," ACM CCS'15, (Oct. 2015), pp. 1558-1569.
Lucas, B., et al., "An Iterative Image Registration Technique with an Application to Stereo Vision," IJCAI, vol. 81, (1981), pp. 674-679.
Määttä, J., et al., "Face Spoofing Detection From Single Images Using Micro-Texture Analysis," IEEE IJCB'11, (Oct. 2011), 7 pages.
Poh, M.Z., et al., "Non-contact, automated cardiac pulse measurements using video imaging and blind source separation," Optics Express, vol. 18, No. 10, (May 2010), pp. 10792-10774.
Shahzad, M., et al., "Secure Unlocking of Mobile Touch Screen Devices by Simple Gestures: You can see it but you can not do it," ACM MobiCom'13, (Sep. 2013), 12 pages.
Shelley, K., et al., "Pulse Oximeter Waveform: Photoelectric Plethysmography," Clinical Monitoring, WB Saunders Company, (2001), pp. 420-428.
Shi, J., et al., "Good Features to Track," IEEE CVPR'94, (Jun. 1994), 33 pages.
Sun, J., et al., "Touchin: Sightless Two-factor Authentication on Multi-touch Mobile Devices," IEEE CNS'14, (Oct. 2014), 14 pages.
Tan, X., et al., "Face Liveness Detection from a Single Image with Sparse Low Rank Bilinear Discriminative Model," ECCV'10, (Sep. 2010), 14 pages.
Tomasi, C., et al., "Detection and Tracking of Point Features," School of Computer Science, Carnegie Mellon University, 1991.
Verkruysse, W., et al., "Remote plethysmographic imaging using ambient light," Optics Express, vol. 16, No. 26, (2008), pp. 21434-21445.
Viola, P., et al., "Rapid Object Detection Using a Boosted Cascade of Simple Features," IEEE CVPR'01, (Dec. 2001), 11 pages.
Xu, S., et al., "Robust efficient estimation of heart rate pulse from video," Biomedical Optics Express, vol. 5, No. 4, (Mar. 2014), pp. 1124-1135.
Xu, y., et al., "Virtual U: Defeating Face Liveness Detection by Building Virtual Models from Your Public Photos," USENIX Association, 25th USENIX Security Symposium (Aug. 10-12, 2016), 17 pages.
U.S. Appl. No. 16/782,349.

* cited by examiner

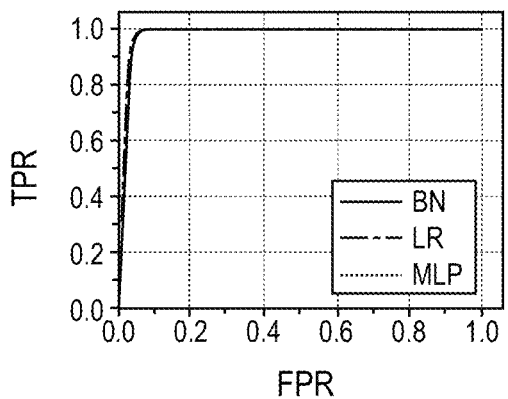
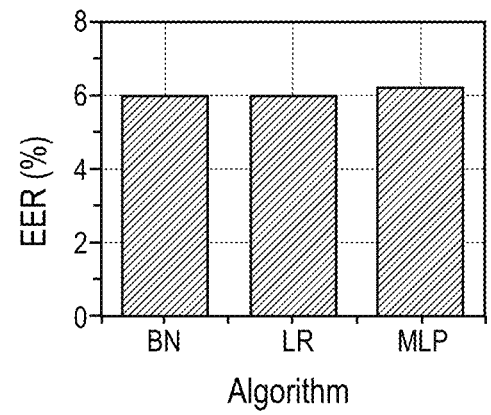
FIG. 6A
FIG. 6B
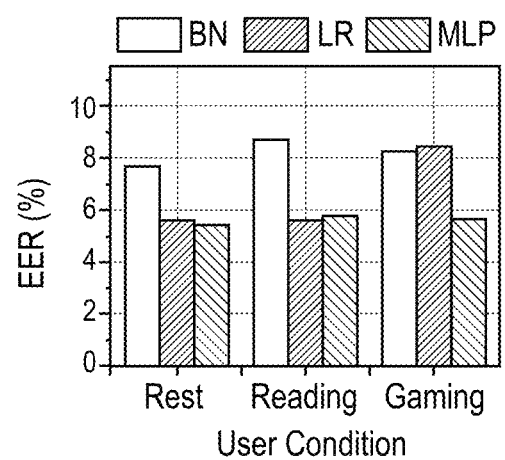
FIG. 7

METHOD AND APPARATUS FOR AUTHENTICATING A USER OF A COMPUTING DEVICE

CROSS-REFERENCE TO RELATED APPLICATIONS

This application claims priority to provisional patent application No. 62/664,844 filed Apr. 30, 2018, entitled "Method and Apparatus for Authentication of a User of a Computing Device".

STATEMENT REGARDING FEDERALLY SPONSORED RESEARCH

This invention was made with government support under contract number CNS-1619251 awarded by the National Science Foundation. The government has certain rights in the invention.

TECHNICAL FIELD

Embodiments of the invention relate to user authentication of a computing device. In particular, embodiments relate to photoplethysmogram-based authentication of a user of a computing device.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Protecting computing devices, and in particular, mobile computing devices, from unauthorized access is becoming more than indispensable in these days. In particular, mobile computing devices, or simply, mobile devices, such as laptop computers, smartphones, and table computers, or simply, tablets, are pervasive in personal life and the business world. They are storing increasingly more highly sensitive information such as personal contacts and multimedia information, usernames and passwords, emails, browsing histories, business secrets, and personal health conditions. At the same time, mobile devices may be lost, stolen, or hacked. For example, according to one study, 70 million smartphones are lost every year, with only 7% recovered, and 4.3% of company-issued smartphones are lost/stolen every year. In addition, according to another study, the malware infection rate on mobile devices rose to 0.75% in Q2 2015 from 0.68% in December 2014, and there were as many Google Android devices infected with malware as Microsoft Windows laptops in the second half of 2014 alone.

User authentication of mobile computing devices, or simply, mobile authentication, is widely adopted to protect mobile devices from unauthorized access and has two forms. First, a user is authenticated to unlock a mobile device. Second, many mobile software applications, or simply, "apps", such as banking apps and password managers authenticate the user before the user can access and use these apps. Mobile authentication traditionally follows a password approach based on Personal Identification Numbers (PINs), alphanumeric passwords, or pattern locks. As functionalities of mobile devices keep improving, people have recently developed more secure and/or usable mobile authentication techniques based on behavioral biometrics such as user input habits, physiological biometrics such as fingerprint or facial recognition, and de-authentication techniques based on proximity.

Embodiments described herein focus on improving and augmenting the security of facial recognition, or "face authentication", functionality on mobile devices. As the name suggests, face authentication verifies or identifies a person by validating selected facial features from a digital image or a video frame of the person's face. The facial features of a person are quite unique and difficult to forge. So face authentication has been very popular in various traditional application scenarios, e.g., gate and automated border control systems. It has also been introduced into mobile devices as a strong authentication method since Google Android 4.0, as well as many apps such as the BioID facial recognition app available from BioID, and the MobilelD app available on Google Play and the Apple App Store. Although embodiments of the invention described herein focus on face authentication on mobile devices, it is appreciated that the embodiments can be generalized to other scenarios and devices involving face authentication.

Face authentication is vulnerable to both photo-based forgery attacks (PFA) and video-based forgery attacks (VFA). In PFA (or VFA), the adversary uses a photo (or video) containing the user's frontal face to bypass the otherwise highly-secure face authentication system. Both PFA and VFA are fairly easy to conduct, as the victim's photo or video or digital images usually can be easily found online, e.g., on popular social network sites. The adversary may also capture the victim's photo or video without being noticed, e.g., in crowded public places or through a camera with telephoto capabilities or a high-definition video camera recorder, even from a long distance.

The prior art defenses against PFA and/or VFA rely on "liveness detection", which attempts to determine that the submitted face photo or video of the legitimate user is indeed captured in real time. The user's eye blink, lip movement, or head rotation in a video have been proposed as live indicators according to some prior art schemes. These schemes are effective against PFA but invalid for VFA. The prior art countermeasures against both PFA and VFA either use an infrared camera to obtain a thermogram—a record made by a thermograph, an instrument that produces a trace or image representing a record of the varying temperature or infrared radiation over an area or during a period of time—of the user's face, or utilize texture analysis to detect the existence of a printed photo, or explore motion analysis to detect the existence of two-dimensional (2D) images. Besides the disadvantage of very high computation complexity, these methods require additional sensors or advanced cameras unavailable in commercially available off-the-shelf (COTS) mobile computing devices.

The accelerometer in almost all COTS devices has recently been explored for liveness detection against PFA and VFA. One prior art approach compares small motions extracted from a recorded video of a user's frontal face and the motions from the accelerometer to see if the motions are consistent. Similarly, another prior art approach compares two motion vectors independently extracted from a recorded video of a user's frontal face and the accelerometer of the mobile device for liveness detection. Although these schemes allegedly are very effective against PFA and VFA, they require the legitimate user to move the mobile device in front of him/herself in some predefined manner, which can be inconvenient or even socially awkward. In addition, the randomness of the user-generated mobile device movement may be too limited so that the adversary may have a good chance to successfully imitate the user after careful observations.

SUMMARY

A system for authenticating a user attempting to access a computing device or a software application executing thereon. A data storage device stores one or more digital images or frames of video of face(s) of authorized user(s) of the device. The system subsequently receives from a first video camera one or more digital images or frames of video of a face of the user attempting to access the device and compares the image of the face of the user attempting to access the device with the stored image of the face of the authorized user of the device. To ensure the received video of the face of the user attempting to access the device is a real-time video of that user, and not a forgery, the system further receives a first photoplethysmogram (PPG) obtained from a first body part (e.g., a face) of the user attempting to access the device, receives a second PPG obtained from a second body part (e.g., a fingertip) of the user attempting to access the device, and compares the first PPG with the second PPG. The system authenticates the user attempting to access the device based on a successful comparison of (e.g., correlation between, consistency of) the first PPG and the second PPG and based on a successful comparison of the image of the face of the user attempting to access the device with the stored image of the face of the authorized user of the device.

BRIEF DESCRIPTION OF THE DRAWINGS

FIG. 6(a) shows the ROC curve under Type-I attacks.

FIG. 6(b) shows the EERs of embodiments of the invention under Type-I attacks in different user conditions.

FIG. 7 illustrates EER performance of embodiments of the invention under Type-I attacks in different user conditions.

DETAILED DESCRIPTION

I. Introduction

Figure 1:
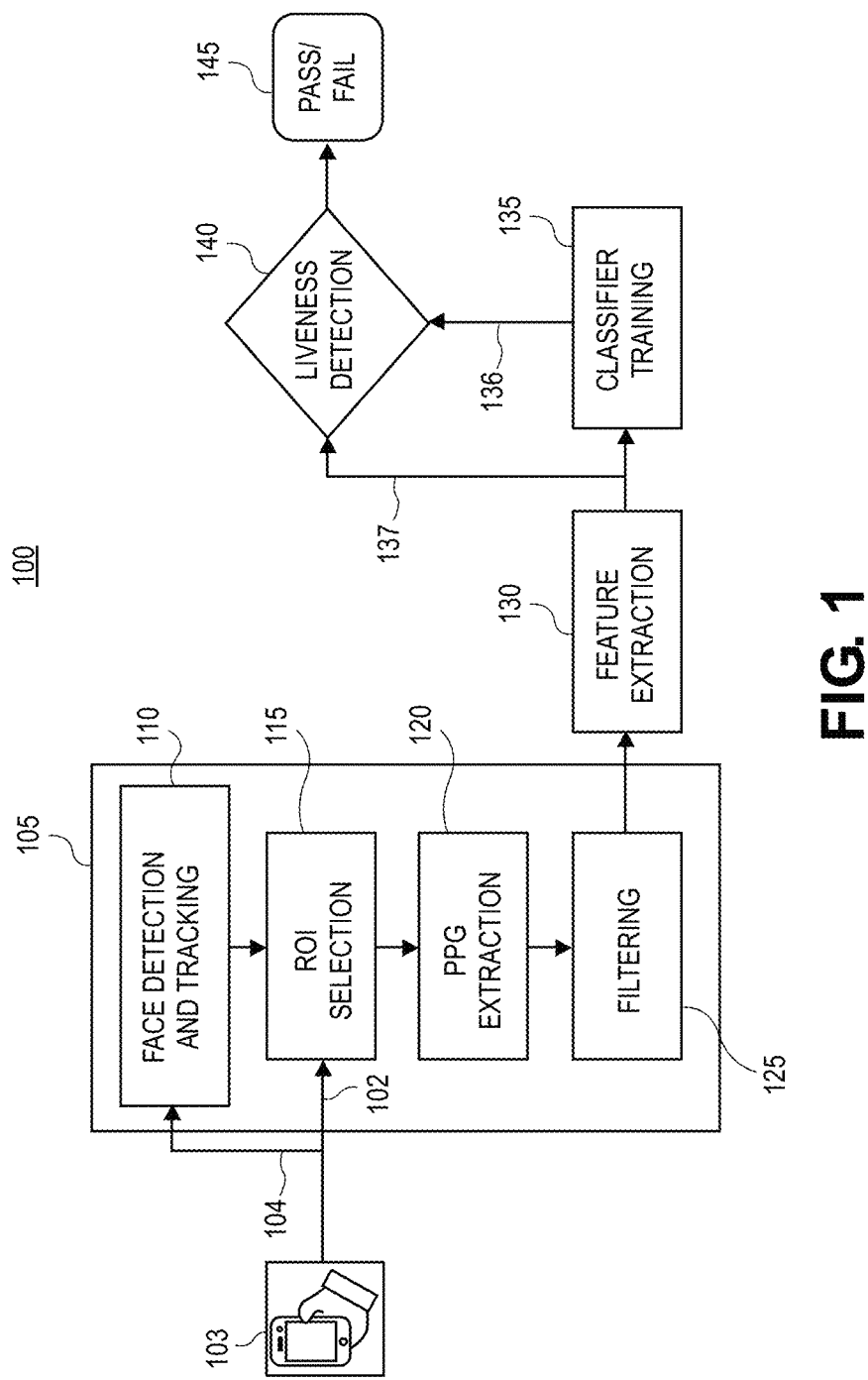
FIG. 1 depicts a flow chart of embodiments of the invention.

A photoplethysmogram (PPG) is an optically obtained plethysmogram that can be used to detect blood volume changes in the microvascular bed of tissue in the human body. A PPG may be obtained by using a PPG sensor, such as a pulse oximeter or equivalent technology which illuminates the skin and measures changes in light absorption. A PPG sensor monitors the perfusion of blood to the dermis and subcutaneous tissue of the skin, and the same can be performed by a video camera positioned within a close viewing range or region of interest of a body part of a person, e.g., the person's face, or a video camera with a light source positioned adjacent a body part of the person, e.g., one of the person's fingertips.

With each cardiac cycle the heart pumps blood to the periphery. Even though this pressure pulse is somewhat damped by the time it reaches the skin, it is enough to distend the arteries and arterioles in the subcutaneous tissue. If the PPG sensor is attached without compressing the skin, for example, to a fingertip or ear lobe, a pressure pulse can also be seen from the venous plexus, as a small secondary peak.

The change in volume caused by the pressure pulse is detected by illuminating the skin with the light, such as a light-emitting diode (LED), and then measuring the amount of light either transmitted or reflected to a photodiode. The shape of the PPG waveform differs from person to person, and varies with the location and manner in which the PPG sensor is attached.

Face authentication emerges as a powerful method for preventing unauthorized access to mobile devices. It is, however, vulnerable to photo-based forgery attacks (PFA) and video-based forgery attacks (VFA), in which the adversary exploits a photo or video containing the frontal view of the user's face, i.e., the user's frontal face, or simply, the user's face.

Effective defenses against PFA and VFA often rely on liveness detection, which seeks to find a live indicator that the submitted face photo or video of the legitimate user is indeed captured live, that is, in real time. Embodiments of the invention provide a novel and practical face authentication system for mobile devices. Embodiments of the invention concurrently, simultaneously, or sequentially in time, record or take a face video with a first, typically the front, camera and take a fingertip video with a second, typically the rear, camera on a mobile device. Embodiments then achieve liveness, or real-time video as opposed to replay or fake video detection by comparing two photoplethysmograms (PPGs) independently extracted from the face and fingertip videos against each other, which should be highly consistent if the two videos are for the same live person and taken at or around the same time. As photoplethysmograms are related to human cardiac activity and almost impossible to forge or control, embodiments of the invention are strongly resilient to PFA and VFA. Extensive user experiments on the Samsung Galaxy S5 mobile smartphone have confirmed the high efficacy and efficiency of embodiments of the invention.

Embodiments of the invention provide a novel and practical liveness detection scheme for securing face authentication on, or access to, computing devices, such as mobile computing devices. Embodiments of the invention work best with mobile devices that have two cameras, preferably both front and rear cameras that are available on most recently shipped mobile phone devices or tablet computers. Embodiments of the invention check the consistency of two close-in-time, e.g., simultaneous, concurrent, or sequential, and independently extracted, photoplethysmograms of the user as the live, or real-time, indicator. For this purpose, embodiments of the invention record a video of the user's face with, for example, the front camera on the mobile device, and a video of the user's fingertip with another, for example, the rear camera on the mobile device at, or near, the same time. Then embodiments of the invention apply photoplethysmography (PPG) to extract two underlying photoplethysmograms from the face and fingertip videos. If the two photoplethysmograms are from the same live person and measured at or around the same time, they are highly consistent. As photoplethysmograms are closely tied to human cardiac activity and/or human heart beat/pulse and almost impossible for an adversary to forge or control, the consistency level of two extracted photoplethysmograms can well indicate or approximate the confidence level in the liveness of a facial recognition-based authentication request to access the mobile device. Thus, embodiments of the invention improve the security of mobile computing devices since cardiac activity is dynamic versus a static fingerprint and/or facial image and far less likely to be successfully copied or compromised by an adversary or attacker. In an alternative embodiment, the mobile device could be used to authenticate a user trying to access another, perhaps co-located, device, or a website or software application the user is attempting to access on the mobile device or the other device, website, or software application.

Embodiments of the invention provide a complete set of tools to check the consistency of two photoplethysmograms for liveness detection. Specifically, given the face or fingertip video, the corresponding photoplethysmogram (PPG) is extracted as a time series (wherein each frame of the respective video streams is one of a sequence of frames, each timestamped), according to the principle of PPG. As a result, two time series can be obtained by using similar computer vision tools. After that, a set of features such as estimated heart rates and cross correlation of the two photoplethysmograms can be calculated by combining the two time series. Finally, lightweight machine learning algorithms are used for classifier training and subsequent testing. Three machine learning algorithms: Bayesian network (BN), logistic regression (LR), and multilayer perceptron (MLP), are used to demonstrate the feasibility of embodiments of the invention.

Extensive experiments were conducted to evaluate the embodiments. 18 users from diverse background were involved in the experiments. In typical settings, embodiments of the invention achieve a true positive rate (TPR) as high as 97.5%, a false negative rate (FNR) as low as 5.2%, and an equal error rate (EER) as low as 5.98%. Furthermore, the impact of various factors on embodiments of the invention were studied, such as the head pose, background illumination, and location. Overall, the experimental results confirm that embodiments of the invention can effectively and reliably defend against PFA and VFA and thus secure face authentication on mobile devices.

II. Background of Camera-Based PPG

In PPG, a photoplethysmogram is an optically obtained plethysmogram, which is a volumetric measurement of cardiovascular shock and sedation. With each cardiac cycle, the heart pumps blood to the periphery of the human body, which generates pressure pulse that distends arteries and arterioles in the subcutaneous tissue. The corresponding volume change generated by the pressure pulse can be detected by measuring the amount of light either transmitted through or reflected from the skin. The evolvement of such volume changes across time carries exactly the user's heart beat signal.

Embodiments of the invention adopt camera-based PPG-based heart rate measurements, described as follows. When the incident light arrives at the user's skin, a major part gets reflected back by the skin surface and does not interact with the tissue underneath the skin. The remaining (minor) part of the incident light first penetrates underneath the skin surface, then is absorbed by the tissue and the chromophores in blood inside arteries and capillaries, and finally gets reflected back to the camera. These two parts are usually referred to as surface reflectance and subsurface reflectance, respectively. The former dominates the overall light received by the camera but does not carry any information of human cardiac activity, while the latter is much smaller but bears the heart beat signal.

Given a skin region-of-interest (ROI) R in the video, the average pixel value at time t can be modeled as $$y(t)=I(\alpha p(t)+b)+n(t), \quad (1)$$

in which y(t) is the average pixel value, I is the incident light intensity in R, $\alpha$ is the strength of blood perfusion, p(t) is the blood volume change pulse, b is surface reflectance from the skin in R, and n(t) is the quantization noise of the camera. $\alpha p(t)$ denotes subsurface reflectance and is much smaller compared to b (i.e., $\alpha p(t) \ll b$). Normally, I can vary across R and may change significantly across time if the illumination source or the environment change across time. Embodiments of the invention assume I to be constant as the duration of the entire authentication process is usually less than five seconds and can be considered very short. Meanwhile, the user is asked to keep as still as possible, and embodiments of the invention try to keep the environment, such as the illumination, as stable as possible. $\alpha$ and b are also assumed to be constants for the same ROI and the same user. On the contrary, n(t) is a random variable, and a large variance of n(t) may mask the small heart beat signal exhibited in p(t). Equivalently, if noise is not considered, y(t) can be viewed as the combination of a large DC part and a small AC part. The latter carries the information of human cardiac activity and can be extracted through a set of signal processing tools.

III. Embodiments of the Invention

Embodiments of the invention can be used as a standalone mobile authentication module in a mobile device operating system (OS) or integrated in any app desiring face authentication, whether that app resides on or executes on the mobile device, or another computing device. In this section, a general description of embodiments of the invention is provided, followed by an overview of embodiments of the invention as implemented in a mobile computing device with two camera, and finally followed by a detailed description of embodiments of the invention.

Figure 16:
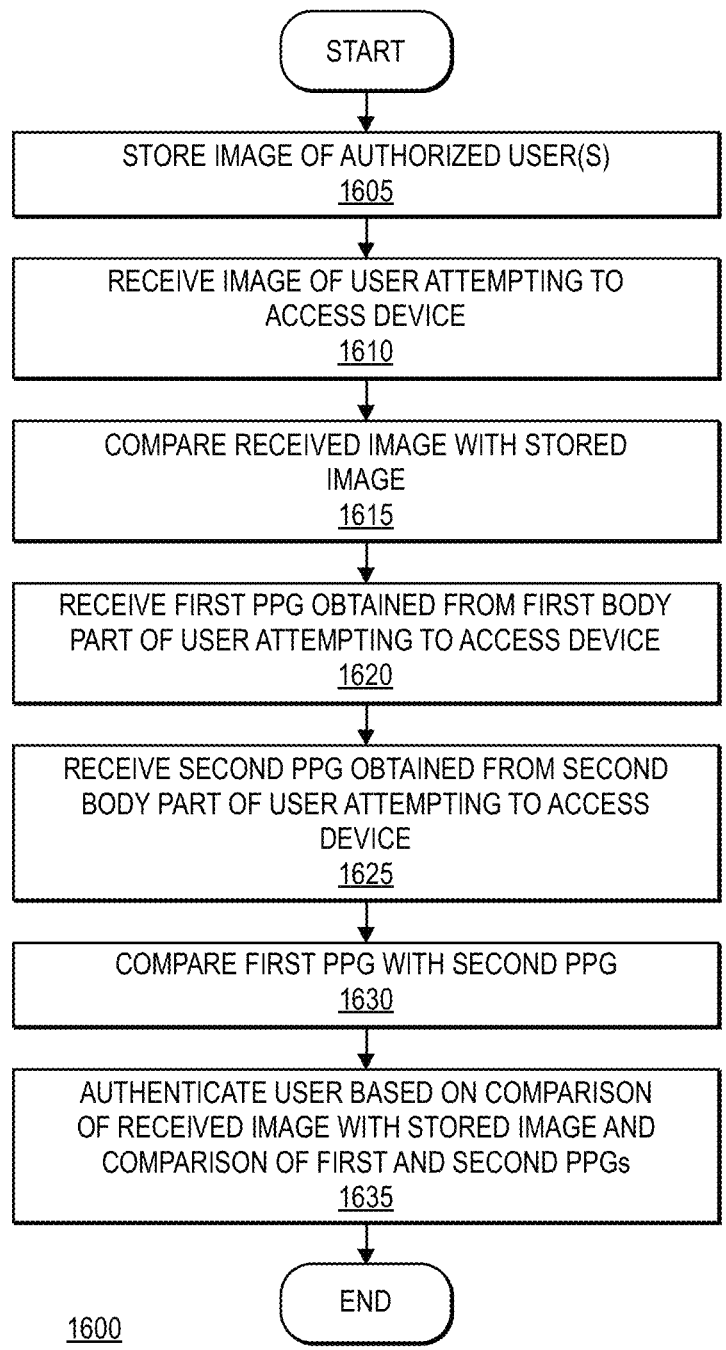
FIG. 16 is a flow chart of an embodiment of the invention.

With reference to FIG. 16, embodiments of the invention 1600 involve a system for authenticating a user attempting to access a computing device or a software application executing thereon. The system for authentication may utilize one or more devices, such as a mobile computing device, e.g., a desktop PC, a laptop computer, a tablet computer, a smart phone, a smart watch, or a fitness activity tracker device. The computing device the user is attempting to access may be one of those devices being used by the system for authentication or a different one of those devices not being used by the system for authentication. For example, a user could be attempting to access a desktop PC or laptop computer and the user's mobile phone may embody the hardware and software and communications capabilities for the authentication system to authenticate the user before allowing the user access to the desktop PC or laptop PC. Alternatively, the device the user is attempting to access and the device providing authentication of the user trying to access the device may be the same device, such as a user's mobile phone. According to another embodiment, the authentication system may involve multiple devices, such as a user's laptop and embedded camera that is used to receive a face video of the user (and extract PPG data therefrom) that is attempting to access the laptop, along with the user's smart watch that includes a PPG sensor to capture PPG data. In some embodiments, the authentication system provides authentication of a user that is attempting to access a software application on one of the aforesaid devices, or an application executing on a web-server or cloud-based computing services provider's hosted computing system, accessible from a web-browser executing on the user's device, e.g., a mobile computing device such as a tablet computer or smart phone.

In one embodiment, a permanent data storage device is accessible to the system in which to store one or more digital images or frames of video of a face of one or more authorized users of the computing device or one or more software applications executing thereon, as depicted at 1605. Typically, these digital images or frames of video of a face of one or more authorized users are obtained and stored when a user installs and configures the authentication system on a computing device, such as their mobile computing device. As part of the installation and/or set up procedure, the authentication system receives as input, for example, multiple pictures, digital images, or videos of a user's face, from various distances and angles, and uses the same to calibrate the facial recognition software that is subsequently invoked according to embodiments of the invention when a user tries to access a computing device or software application executing thereon.

When a user tries to access a device that requires authentication of the user, the computing device in which the authentication system is embodied, e.g., the user's mobile computing device or smart phone, receives at 1610 from a first video camera one or more digital images or frames of video, that is, an image, of a face of the user attempting to access the device.

Given the stored images of authorized users in step 1605, embodiments compare the image of the face of the user attempting to access the device, received at step 1610, with the stored image of the face of the authorized users of the device, stored at step 1605. If there is a match, then the process continues at step 1620, otherwise, the process according to embodiments of the invention may end at this point, and an error message displayed to the user that authentication failed, and/or access to the device is denied.

According to embodiments of the invention, in addition to performing facial recognition of the user attempting to access the device using the received frames of video of the user, the embodiments further receive at step 1620 a first photoplethysmogram (PPG) obtained from a first body part of the user attempting to access the device. The body part may be the face of the user, or a different body part, such as a wrist, fingertip, or ear lobe of the user. Further, at step 1625, the embodiments receive a second PPG obtained from a second body part of the user attempting to access the device, different than the first body part. At step 1630, the first PPG is compared to the second PPG. If the PPGs were obtained from different body parts of the same user, there is a level of consistency or correlation between the PPGs suggesting that the PPGs that are input are from a real person, and thus the face video received from the user is very likely a real time or live video of the user not a video forgery attack, e.g., an adversary using a video clip of the user captured at a different time and/or place or with a different device, and supplied by the adversary as though it was a current, live, video of the user's face.

According to embodiments of the invention, if the comparison of the received facial image with at least one previously stored facial image of an authorized user is successful at step 1615 and if the first and second PPGs are consistent with each other, then embodiments authenticate the user attempting to access the device based on the successful comparison of the first PPG with the second PPG and based on the successful comparison of the image of the face of the user attempting to access the device with the stored image of the face of the authorized user of the device, at step 1635.

According to embodiments, the first and second PPGs may obtained from a PPG sensor, a video camera, or a video camera with a light source. A PPG sensor or video camera with a light source would be positioned adjacent a body part. A change in volume caused by the person's pressure pulse is detected in such cases by illuminating the person's skin with the light provided by the sensor or video camera, and then measuring the amount of light either transmitted or reflected. A video camera may also capture a video of a user from a distance, e.g., a close up video of a user's face, taken by a user with their own camera-equipped computing device, e.g., positioned generally at or within arm's length of the user's face.

Figure 17:
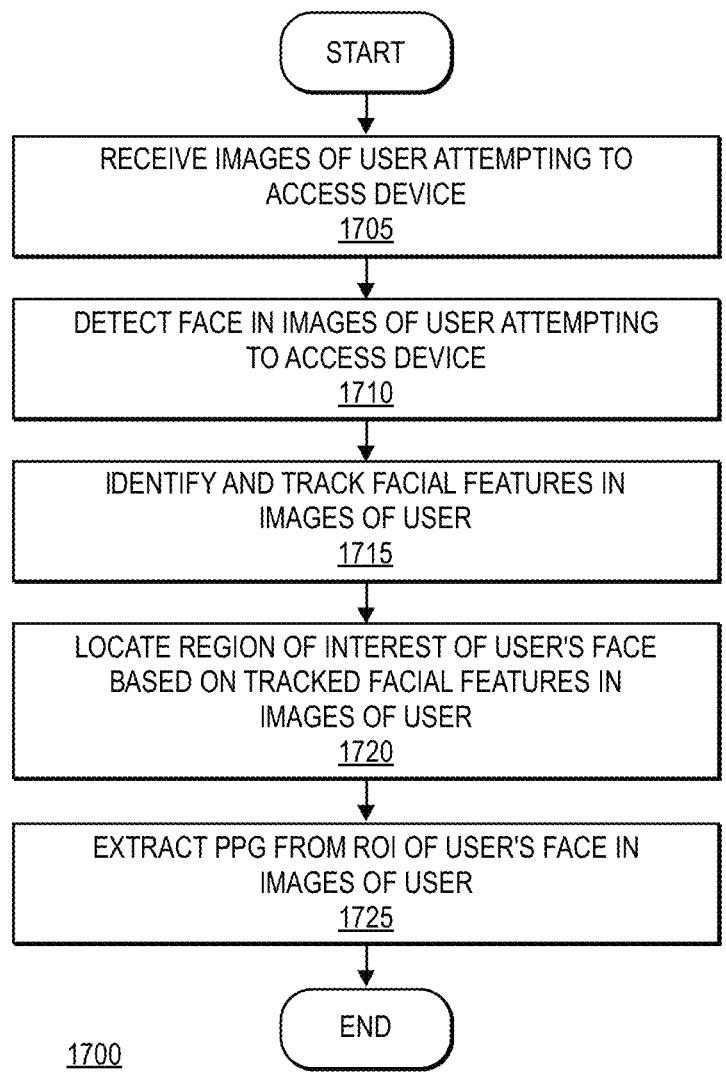
FIG. 17 is a flow chart of an embodiment of the invention.

With reference to FIG. 17, in embodiments 1700 where a camera captures a video of the user's face, there are additional steps required to obtain a PPG therefrom. After receiving a video of user at 1705, the system detects the user's face in a frame, e.g., the first frame, of the video, at step 1710. In one embodiment, the system detects the user's face in multiple frames of the video.

In another embodiment, instead of performing facial detection on every frame of the face video, which can be costly in terms of computer processing and data storage resources, embodiments employ a feature tracker algorithm to identify facial features and track the identified facial features from frame to frame, at step 1715. The facial detection and tracking functions can obtain coordinates of a user's face in each frame. The coordinates define a polygon in each frame that approximates the whole face region of the user's face.

According to embodiments, the system then selects at 1720 a region of interest (ROI) within the polygon in each frame that approximates the whole face region, and then extracts at 1725 a PPG from the selected ROI, for example, by averaging all pixel values therein.

According to one embodiment, the second PPG obtained from the second body part of the user attempting to access the device involves receiving from a second video camera one or more digital images or frames of video, i.e., a the second image, of a fingertip of the user attempting to access the device and then extracting the second PPG from the second image. In this embodiment, authenticating the user attempting to access the computing device or the software application executing thereon contemplates the first video camera is a front-facing camera on a mobile computing device and the second video camera is a rear-facing video camera on the mobile computing device, as more fully described below.

According to one embodiment, the second video camera that receives the second image of the fingertip of the user attempting to access the device does so simultaneously with, concurrently with, or within a system-configured period of time after, a time during which the system receives from the first video camera the image of the face of the user attempting to access the device.

A. Embodiment for Mobile Computing Device with Two Cameras

Embodiments of the invention using a mobile computing device with two cameras work as follows. First, the user uses their fingertip to cover the rear camera and flashlight of the mobile device without applying any significant pressure. Then embodiments of the invention use the front and rear cameras concurrently or simultaneously, or within a period of time according to a system selected or configured time window, e.g., within 5-30 seconds of each other, to record the face and fingertip videos, respectively, for some period of time, such as 3 to 10 seconds. Ideally, the user should stay as still as possible while the recording is ongoing. Next, embodiments of the invention extract two photoplethysmograms (PPGs) from the two videos, one from each, and compares the PPGs for liveness detection. In the meantime, according to one embodiment, one frame of the face video (for instance, any frame after the first second of recording) is sent to a face authentication module on the mobile device to determine whether the person in the frame is the legitimate user. Only when liveness detection and the face authentication both succeed is the user considered authentic, according to one embodiment.

More generally, embodiments of the invention rely on two separately obtained PPGs and check for a consistency or correlation between the two PPGs to verify a real live person is providing the face video and that the face video is not a photo forgery attack (PFA) or video forgery attack (VFA).

There are devices in use today that provide PPG data directly, such as a smart watch or wearable fitness or activity tracker device. Thus, embodiments of the invention may use a camera on a smartphone to capture a video of the face of the user, but may use other inputs to obtain PPG data directly from the user, such as data obtained from a smart watch or fitness or activity tracker.

Given a pair of face and fingertip videos, and with reference to FIG. 1, embodiments of the invention 100 use the following modules to accomplish liveness detection. The signal processing module 105 is first invoked to obtain two photoplethysmograms independently from the face and fingertip videos. Then the output is fed into the feature extraction module 130 to generate a feature vector which characterizes the consistency level of the two photoplethysmograms. In the next classifier training module 135, machine learning algorithms are used to train a classifier based on a library of feature vectors. Finally, the classifier is used in the liveness detection module 140 to determine whether a new pair of face and fingertip videos can pass liveness detection.

B. Signal Processing

As shown in FIG. 1, according to embodiments of the invention 100, a signal processing module 105 comprises four submodules: a face detection and tracking submodule 110, a ROI (region-of-interest) selection submodule 115, a photoplethysmogram extraction submodule 120, and a filtering submodule 125. The face video requires all four submodules, while the fingertip video just uses the last three, according to the embodiments as discussed below.

1) Face Detection and Tracking

In this step, the face detection and tracking submodule 110 first detects the user's face in a frame, e.g., the first frame, of the face video, captured by a camera on mobile phone device 103 and input at 104 from mobile device 103, using a detection algorithm such as the Viola-Jones detection algorithm. This algorithm can work in real time and is highly accurate.

Next, instead of applying facial detection to every frame of the face video, which is costly in terms of computer processing and data storage resources, submodule 110 uses a feature tracker algorithm, such as the Kanade-Lucas-Tomasi (KLT) feature tracker, to track identified features from frame to frame. More specifically, the KLT feature tracker identifies multiple local feature points in a current frame, commonly known as "good features to track". Then it tries to search as many as possible of the identified feature points in a previous frame. Given two sets of features points in the current and previous frame, the KLT feature tracker can estimate the translation, rotation, and scale between the two consecutive frames and then compute an affine function for face tracking. Since the duration of the face video is short, the established feature tracker is still valid for the last frame.

Finally, the face detection and tracking submodule 110 can obtain the coordinates of the user's face in each frame. As depicted in FIG. 2(*a*), the submodule 110 obtains a number of coordinates forming a polygon in each frame that approximates the whole face region. In one embodiment, there are four coordinates 201, 202, 203, and 204 forming a rectangular box 205 in each frame, which approximates the whole face region. The many cross markers "+", a handful of which are labeled 206, 207, 208, 209, 210 depict the "good features to track" of the shown frame.

2) ROI Selection

FIG. 2(*b*), FIG. 2(*c*), and FIG. 2(*d*) respectively illustrate three most frequently used regions of interest (ROIs), denoted by $R_1$ 215, $R_2$ 220, and $R_3$ 225, respectively. ROI selection submodule 115 receives the output of the face detection and tracking submodule 110 and selects a region of interest (ROI) within the polygon in each frame that approximates the whole face region. The selection of ROI affects the extraction of PPG traces in the next submodule 120. Embodiments may select the ROI considering one or both of accuracy and cost. Some schemes use random selection while some others assign weights to every segment in the ROI. The reason is that the extracted photoplethysmogram is proportional to p(t) in Eq. (1), i.e., the amount of blood volume change underneath the ROI. Meanwhile, the distribution of blood carrying capillaries differs from region to region, further resulting in different amount of extractable photoplethysmogram information. The size of the selected ROI may also have influence on the extracted photoplethysmogram. On the one hand, a smaller size requires a highly accurate face tracker to avoid too much noise in the extracted photoplethysmogram. On the other hand, a larger size averages the contribution across the entire region and therefore may reduce the strength of the photoplethysmogram.

One embodiment of the invention chooses $R_3$ 225, depicted in FIG. 2(*d*), as the ROI for extracting, that is, from which to extract, a photoplethysmogram, which is the central part of the whole face and encompasses 60% of the width and the full height of the detected face region. In contrast to $R_1$ 215, depicted in FIG. 2(*b*), and $R_2$ 220, depicted in FIG. 2(*c*), that require a resource-demanding feature detector, $R_3$ 225 only requires the basic computationally efficient Viola-Jones detector. In addition, experimental evaluations, as described below, show that $R_1$ 215 and $R_2$ 220 do not provide much performance improvement over $R_3$ 225 mainly because the required face tracker has limited accuracy in constrained mobile environments. One embodiment may use a weighted combination of multiple ROIs, which nevertheless requires multiple iterations and thus incurs larger computation overhead.

3) Photoplethysmogram Extraction

PPG extraction submodule 120 receives the selected ROI output by ROI selection submodule 115 and extracts the photoplethysmogram from the selected ROI, according to one embodiment, by averaging all pixel values therein. A recorded video has three channels: red, green, and blue. It is widely accepted that the three channels carry different amounts of photoplethysmogram information. The green channel carries the strongest photoplethysmogram, as the green light is easier to absorb by hemoglobin in the blood and thus penetrates deeper into the skin. An embodiment may use all three channels to enhance the SNR of the extracted photoplethysmogram, but such an embodiment is not necessarily beneficial because the three channels do not yield statistically mutually independent information. So PPG extraction submodule 120, according to one embodiment, obtains the photoplethysmogram only from the green channel.

4) Filtering

Filtering submodule 125 accepts as input the extracted photoplethysmogram output by PPG extraction submodule 120 and applies two filters to the extracted photoplethysmogram. First, a Normalized Least Mean Square (NLMS) adaptive filter is applied to alleviate the illumination interference. The motivation for doing so is that small environment changes-such as a person passing by or small camera movements—may induce overall illumination shifting in the video. This undesirable effect can be mitigated by estimating the amount of interference and then subtracting it from the overall measurement. Embodiments of the invention use y(t) to denote the photoplethysmogram of a selected ROI R. Given the illumination interference, y(t) can be divided into two parts:

$$y(t) = y_c(t) + n_i(t), \quad (2)$$

where $y_c(t)$ is due to human cardiac activity, and $n_i(t)$ is due to illumination interference. $n_i(t)$ can be assumed to be proportional to the average pixel value of the background regions other than the face region. Embodiments of the invention thus have $$n_i(t) = h y_{bg}(t), \quad (3)$$

where $y_{bg}(t)$ is the average pixel value of a selective background region, and h is a linear coefficient. In one implementation, embodiments of the invention simply select a pixel block of 20×20 in the top right corner in each frame as the background region. h can be estimated by the NLMS adaptive filter as $$h(j+1) = h(j) + \mu \frac{y_c(j)}{|y_{bg}(j)|}, \, j = 0, 1, 2, \ldots, N-1 \quad (4)$$

Here μ is the step size equal to 1, and N is the length of y(t) (or $y_c(t)$, equivalently). Embodiments of the invention also set h(0)=0 in the implementation. After the final h=h(N) is obtained, $n_i(t)$ can be subtracted from y(t) according to Eq. (2) to finally reveal $y_c(t)$.

Next, filtering submodule 125 applies a bandpass FIR filter (second-order Butterworth filter) with a passband of [0.7, 4] Hz to reduce the interference of out-of-band noise.

Figure 3:
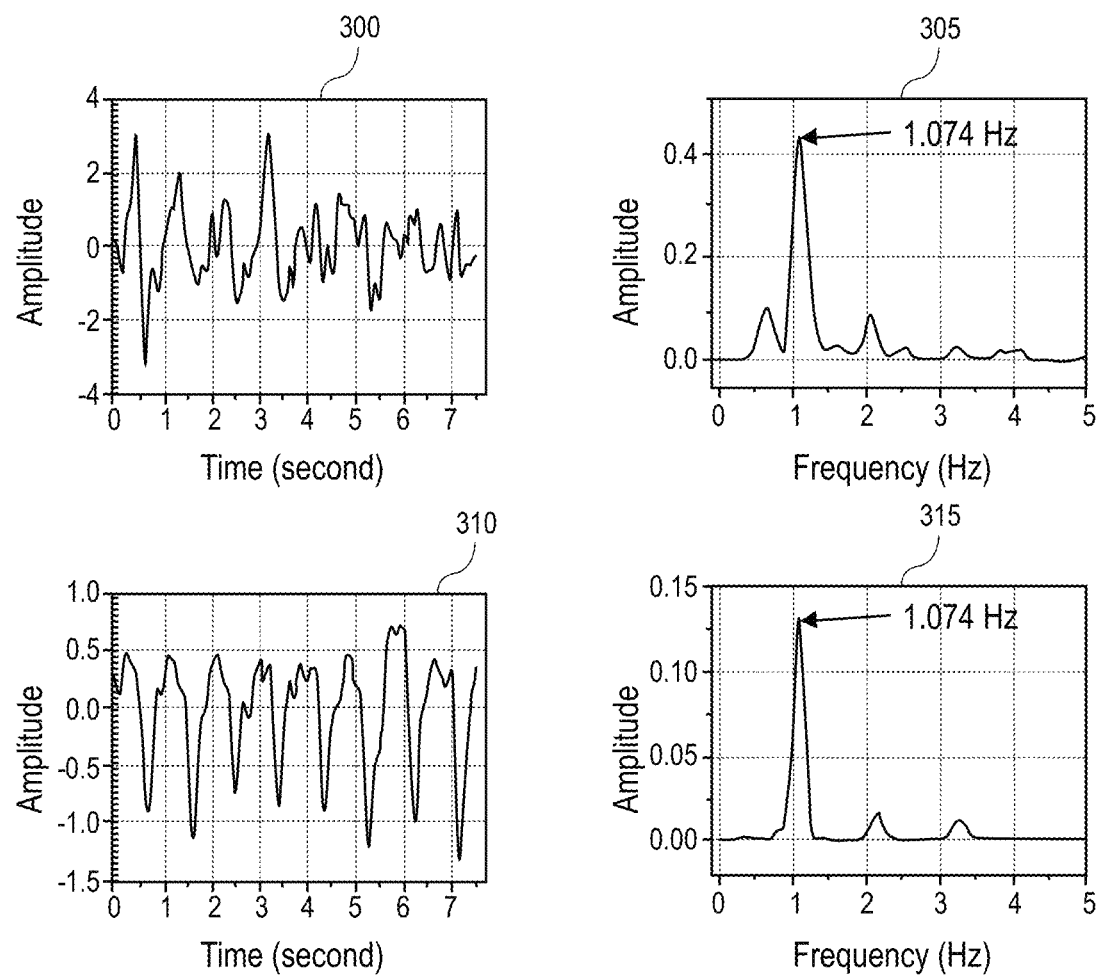
FIG. 3 illustrates extracted photoplethysmograms by time and frequency.

FIG. 3 illustrates the significant noise for the face PPG, in both the time domain, in graph 300, and in the frequency domain, in graph 305. The signal after filtering is the final photoplethysmogram that is transmitted to feature extraction module 130 and used for liveness detection according to embodiments of the invention.

5) Processing Fingertip Video

The discussion heretofore in this section regarding signal processing relates to extracting the photoplethysmogram for a face video. The signal processing steps discussed below relate to extracting the photoplethysmogram from a fingertip video. Extracting the photoplethysmogram from a fingertip video is much easier. Specifically, no face detection or tracking is needed so submodule 110 is not involved, and the entire frame is used as the ROI, so signal processing module 105 receives the fingertip video from mobile device 103 at 102 and passes it through ROI selection submodule 115 to PPG extraction submodule 120, or is input directly to PPG extraction submodule 120, bypassing ROI selection submodule 115.

Further, since the rear camera of mobile phone 103 is fully covered by the user's fingertip, there is no illumination interference. See, for example, FIG. 3, which illustrates the minimal noise for the fingertip PPG, in both the time domain, in graph 310, and in the frequency domain, in graph 315. Thus, the NLMS adaptive filter submodule 125 is not needed, and the extracted photoplethysmogram from the fingertip video is transmitted directly to feature extraction module 130.

C. Feature Extraction

In this module 130, the two extracted photoplethysmograms received from signal processing module 105 are used to calculate a feature vector for classifier training and liveness detection. Let the photoplethysmograms from the face and fingertip videos by denoted by $P_{face}$ and $P_{ftip}$, respectively. $P_{face}$ and $P_{ftip}$ are two time series of the same length N, from which the following features are calculated.

Heart Rate Difference.

The heart rate difference is the absolute difference between the heart rates from the face and the fingertip PPGs. Embodiments of the invention denote them by $h_{face}$ and $h_{ftip}$, respectively. To obtain $h_{face}$, feature extraction module 130 first multiplies $P_{face}$ with an N-point Hanning window such that the two endpoints of $P_{face}$ can meet rather than having a sharp transition between them. Then the feature extraction module 130 applies a fast fourier transform (FFT) on windowed $P_{face}$, selects the highest peak within [0.7, 4] Hz, multiplies it by 60, and obtains $h_{face}$. The feature extraction module 130 can also obtain $h_{ftip}$ in the same way. Then the heart rate difference is calculated as $$\Delta h = |h_{face} - h_{ftip}| \qquad (5)$$

Maximum Cross Correlation.

The feature extraction module 130 also obtains the maximum cross correlation between $P_{face}$ and $P_{ftip}$ by searching the optimal alignment between them. Specifically, the module 130 first obtains the optimal alignment $\hat{k}$ by the following equation.

$$\hat{k} = \arg\min \sum_{i=1}^{N-k+1} \frac{P_{face}(i) P_{ftip}}{N-k}, \qquad (6)$$

subject to $$0 \le k < N_{ftip}.$$

Here $N_{ftip}$ is the approximate length of a period of $P_{ftip}$ and equals $$\left\lceil \frac{60 F_s}{h_{ftip}} \right\rceil,$$

where $F_s$ is the frame rate of the fingertip video (and equivalently that of the face video). After $\hat{k}$ is found, module 130 truncates $P_{face}$ and $P_{ftip}$ into two shorter vectors of the same length as $$\tilde{P}_{face} = P_{face}(1:N-\hat{k}), \tilde{P}_{ftip} = P_{ftip}(\hat{k}+1:N). \qquad (7)$$

Then the maximum ratio is calculated as $$\rho_{max} = \sum_{i=1}^{N} \frac{\tilde{P}_{face}(i) \tilde{P}_{ftip}(i)}{\tilde{N}} \qquad (8)$$

-continued $$\tilde{N} = N - \hat{k}.$$

Mean, min, max, and standard deviation of amplitude ratio. Given the aligned $\tilde{P}_{face}$ and $\tilde{P}_{ftip}$, module 130 first calculates amplitude ratio as $$R(i) = \frac{P_{face}(i)}{P_{ftip}(i)}, i = 1, 2, \ldots, \tilde{N}.$$

Then module 130 further calculates the mean, min, max, and standard deviation of R as features, denoted by $R_{mean}$, $R_{min}$, $R_{max}$, and $R_{SD}$, respectively, wherein R is a ratio vector between the two PPG traces.

D. Classifier Training

Classifier training module 135 receives the features extracted by feature extraction module 130. The classifier training module provides a training set that contains two classes of instances. Each instance consists of a feature vector in the form of $v=[\Delta h, \rho_{max}, R_{mean}, R_{min}, R_{max}, R_{SD}]$. The feature vectors of the instances in Class I (labelled as l=1) are computed from a pair of concurrently or simultaneously recorded face and fingertip videos. On the contrary, those of the instances in Class II (labelled as l=0) are computed from a pair of face and fingertip videos recorded separately. Ideally, the classifier should be able to label the instances in both classes as accurately as possible. The classifier training module 130, according to one embodiment, uses and compares three supervised machine learning techniques in the Weka library or toolkit available from the University of Waikato, New Zealand (www.cs.waikato.ac.nz/ml/weka/) for classifier training and testing: Bayesian network (BN), logistic regression (LR), and multilayer perceptron (MLP). In particular, BN is based on constructing a probabilistic graphic model representing a set of random variables and their conditional dependencies via a directly acyclic graph. The constructed probabilistic model is used to infer the label of unlabeled instances. LR uses the sigmoid function as the hypothesis to estimate the relationship between the features and corresponding labels. MLP is a feedforward artificial neural network model that maps the sets of input data onto a set of appropriate output. One advantage of MLP is that it can be used to distinguish data that are not linearly separable.

The classifier training module 135 is neither user-specific nor device-specific. It is exclusively done by a developer of software implementing embodiments of the invention, who can easily maintain and update a large number of instances for Classes I and II. The trained classifier is preloaded into the mobile device or a device with which the mobile device is in communication when the software is installed.

E. Liveness Detection

The classifier training module 135 outputs at 136 the training set that contains two classes of instances to liveness detection module 140. Later, a new (i.e., subsequent) pair of face and fingertip videos for authentication are input from signal processing module 105 to feature extraction module 130 which computes the corresponding feature vector and then inputs the corresponding feature vector into the liveness detection module 140 via path 137, bypassing classifier training module 135. If the output label of the liveness detection model 140 is 1, the new pair passes liveness detection and fails otherwise 145. In the former case, if the face image additionally passes conventional face authentication, the user is deemed legitimate, according to one embodiment of the invention.

IV. Performance Evaluation

A. Adversary Model

Embodiments of the invention consider a typical adversary model. The adversary possesses the victim's mobile device and seeks to pass the face authentication employed by the device itself or some applications thereon, in particular, sensitive apps containing personal or confidential information. Since VFA can be considered an advanced version of PFA, performance evaluation focuses on evaluating the resilience of embodiments of the invention to VFA. The adversary can surreptitiously obtain the videos containing the legitimate user's frontal face, e.g., by online searches or real time capturing through a high-definition camcorder from a long distance. In contrast, fingertip videos are very rare online or almost impossible to capture in real time, so the adversary can only use their fingertip video or that of a random user. In addition, the adversary may be fully aware that an embodiment of the invention is in use. Embodiments of the invention contemplate two types of VFA as follows.

Type-I VFA.

This attack does not involve any real time video recording and serves as a "stress test" for embodiments of the invention. In particular the adversary directly feeds his fingertip video and the victim's face video into an embodiment of the invention as tested. Each participant in experiments is assumed as the adversary once, in which case the other participants are used as the victims.

Type-II VFA.

This attack resembles the practical attack scenario. The adversary first replays the victim's face video on the screen of his/her own device such as an Apple iPad. The distance between the victim device and the adversary's device screen is properly adjusted such that the victim device's front camera can well capture the victim's face in the replayed video. While the face video is replayed and recorded, the adversary lets the victim device's rear camera take his/her fingertip video concurrently or simultaneously. Two random participants are chosen as the adversary for the Type-II VFA. When either is chosen, each other participant serves as a victim.

B. Experiment Setup

Experiments conducted with embodiments of the invention used a Samsung Galaxy S5 mobile smartphone. In particular, the experiments utilized the dual-camera mode of the Camera app on the Samsung Galaxy S5, which can record a video with both the front and rear cameras concurrently or simultaneously. The frame size of the recorded video is 720×1280 pixels, which can be equally divided into the upper and lower parts, corresponding to the face and fingertip videos, respectively. After the useless blackregion on left and right sides is removed, the frame size of both face and fingertip videos becomes 480×640 pixels. Since almost all recently shipped mobile devices have both front and rear cameras, it is rather straightforward to obtain the concurrently or simultaneously-recorded face and fingertip videos on other mobile device models.

18 participants were recruited in the experiments, including two females and 16 males. The participants are graduate students in Arizona State University, whose ages range between 20 and 35. All the participants were given the following instructions. First, each participant tries to sit as still as possible. The distance between the user and the front camera varies between 30 to 45 cm, which has been proved to be a convenient distance for the users and the captured user face is reliably detected. Then s/he activates the dual-camera mode of the Camera app on Galaxy S5 and ensures that the front camera properly captures her/his frontal face. Subsequently, s/he rests any of her/his fingertips on the rear camera without applying any significant pressure. Finally, s/he proceeds to record a video of approximately ten seconds by tapping the video recorder icon.

As cardiac activity highly depends on current user conditions, the videos were recorded when the participant was under different conditions to fully evaluate the performance of embodiments of the invention. In particular, three user conditions were investigated. Under a rested condition, each participant was asked to sit quietly without her/his legs crossed for five minutes. After that, s/he recorded 15 videos. Under a second, reading, condition, each participant was asked to read recent news on a smartphone for five minutes. After that, s/he recorded 15 more videos. Under the third, gaming, condition, each participant was asked to play the video game "No Limits" or "Strikers 1945-3" on a smartphone for five minutes. After that, s/he recorded another 15 videos. For the same participant, cardiac activities are expected to be different under these three conditions. Particularly, the heart rate of the same user in the gaming condition is usually higher than those in the rest and reading conditions, which the experiments confirmed.

The following default settings were used unless stated otherwise. Participants were asked to maintain the front head pose during video recording. Videos were recorded under normal illumination in a typical research lab (e.g., 500 lux). During the recording process, other persons may leave/enter the lab.

The main dataset, denoted by $S_i$, consists of S p for positive (Class I) instances and $S_n$ for negative (Class II) instances. The instances in $S_p$ come from legitimate users, while those in $S_n$ are from Type-I adversary. Given 18 participants with each recording 15 videos under each of the three user conditions, there are 18×3×15=810 instances in $S_p$. The experiment first randomly selected two pairs of face and fingertip videos for each participant. Each participant acted as the adversary once, in which case each other participant acted as the victim. So $S_n$ contains 2×2×17=68 instances per participant and 68×18=1224 instances in total. For the following evaluations, the experiment repeated the generation process of $S_n$ for 40 times and obtained the average results.

C. Performance Metrics

Embodiments of the invention as tested use the following performance metrics.

Receiver operating characteristic (ROC) curve. An ROC curve can be used to illustrate the performance of a binary classifier as its discrimination threshold changes. An ROC curve can be obtained by plotting TPR (true-positive rate) with respect to FPR (false-positive rate) in various threshold settings.

Acceptance Rate.

Embodiments of the invention as tested define the acceptance rate as the ratio between the number of correctly-classified positive (legitimate) instances and that of all positive instances in a testing dataset. A higher acceptance rate means that the system is more likely to admit legitimate users.

Detection Rate.

Embodiments of the invention as tested define the detection rate as the ratio between the number of correctly-classified negative (adversarial) instances and that of all negative instances in a testing dataset. A higher detection rate means that the system can more effectively detect VFA.

Computation Time.

Embodiments of the invention as tested define the computation time as the time it takes to determine whether a given pair of face and fingertip videos can pass liveness detection. Intuitively, the computation time should be as short as possible.

D. Experimental Results

1) Video Length

Figure 4A:
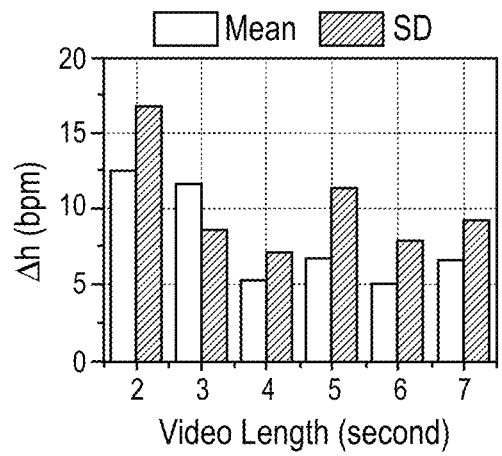
FIG. 4(a) illustrates the impact of video length on Δh.

FIG. 4(a) shows the mean and standard deviation (SD) of $\Delta h$ in $S_p$, which is the absolute difference between $h_{face}$ and $h_{ftip}$ in the same authentication session. Since the SNR of the photoplethysmogram from the fingertip video is usually high, $h_{ftip}$ can be treated as the reference heart rate. As can be seen, the mean and SD of $\Delta h$ decrease from around 12 and 17 bpm to around 5 and 7 bpm when the video length increases from two to four seconds. This means that the accuracy of $h_{face}$ increases along with the video length. When the video length is larger than four seconds, the mean and SD of $\Delta h$ do not change as much.

Figure 4B:
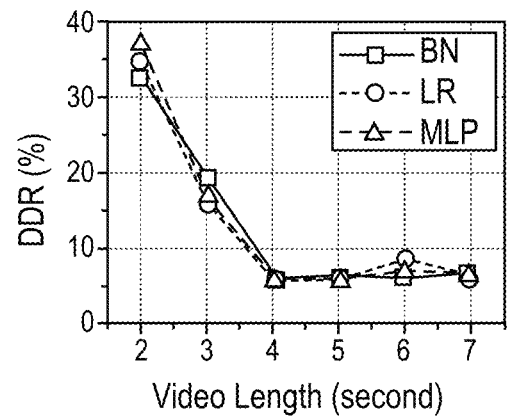
FIG. 4(b) illustrates the impact of video length on EER.

FIG. 4(b) shows the EER (equal error rate) of embodiments of the invention under the Type-I attack using S. Embodiments of the invention exhibit similar EER performance with Bayesian Network, Logistic Regression, and Multilayer Perceptron (BN, LR, and MLP). Therefore, it is believed that embodiments of the invention work well along with mainstream machine learning algorithms. FIG. 4(b) illustrates that the EER decreases quickly when the video length increases from two to four seconds and then stays relatively the same as the video length further increases. Such results are consistent with those in FIG. 4(a) because a smaller $\Delta h$ indicates that the two corresponding photoplethysmograms in the same authentication session are more consistent. Consequently, this makes it easier for the classifier to distinguish between positive and negative instances, leading to a lower EER.

As a shorter video length means that the legitimate user can record a shorter video for authentication, the required minimum video length according to embodiments of the invention is preferably as short as possible. Based on the above results, the default video length is set to four seconds hereafter unless specified otherwise.

2) ROI

Figure 2A:
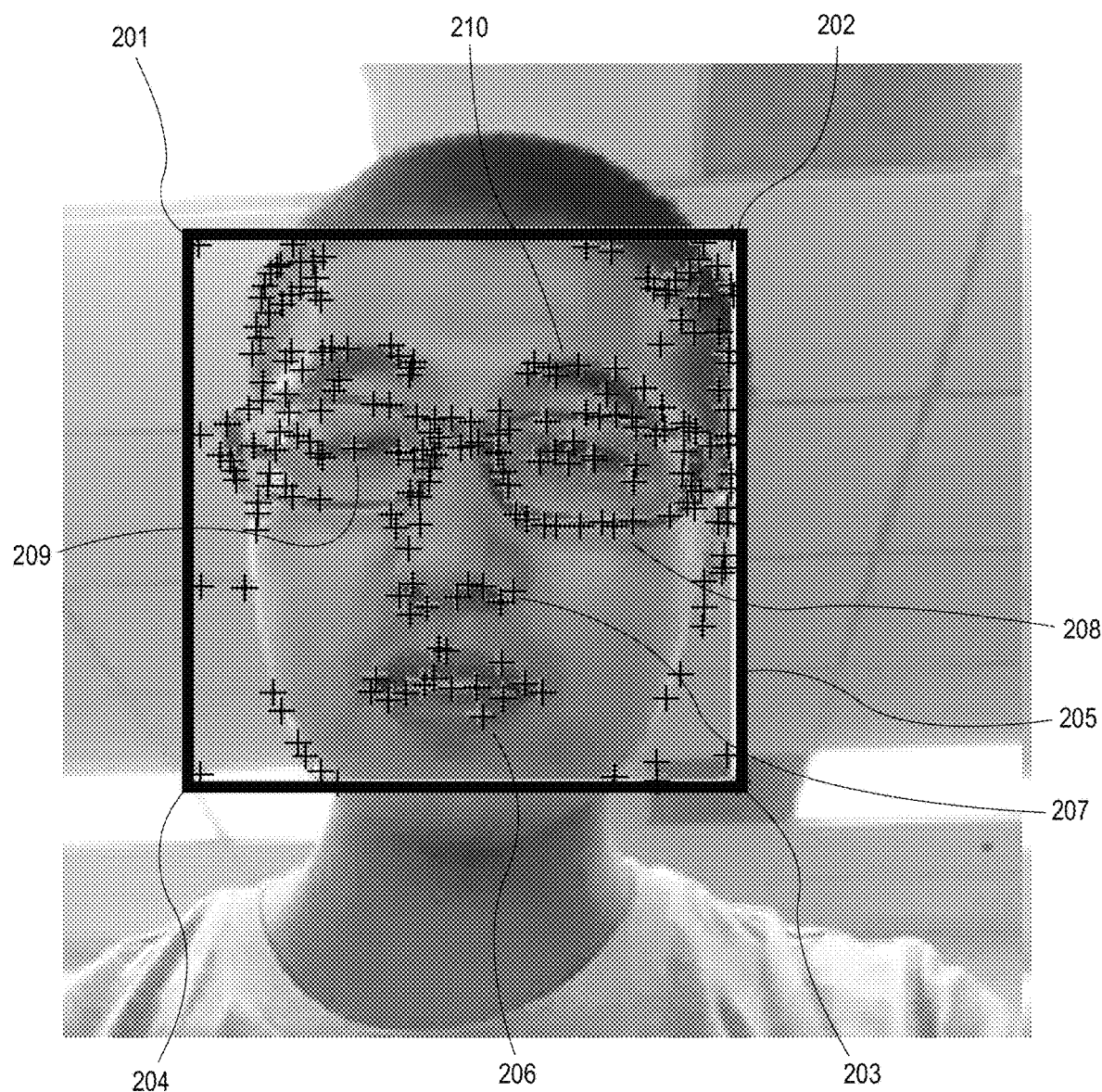
FIG. 2(a) depicts obtaining a number of coordinates forming a polygon in each frame of a video of a user that approximates the whole face region of the user, according to embodiments of the invention.
Figure 2B:
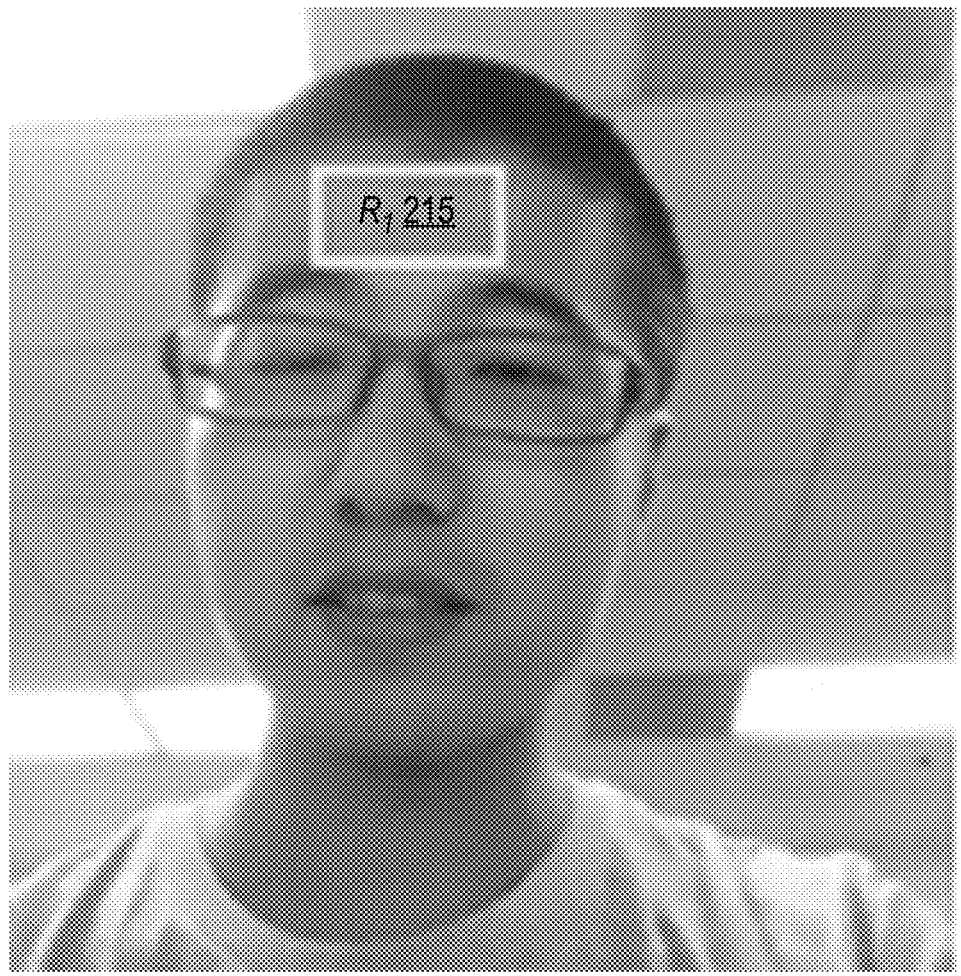
FIG. 2(b) illustrates one of the three most frequently used Regions of Interest (ROIs), denoted by R1 as may be utilized in embodiments of the invention.
Figure 2C:
FIG. 2(c) illustrates another of the three most frequently used Regions of Interest (ROIs), denoted by R2, as may be utilized in embodiments of the invention.
Figure 2D:
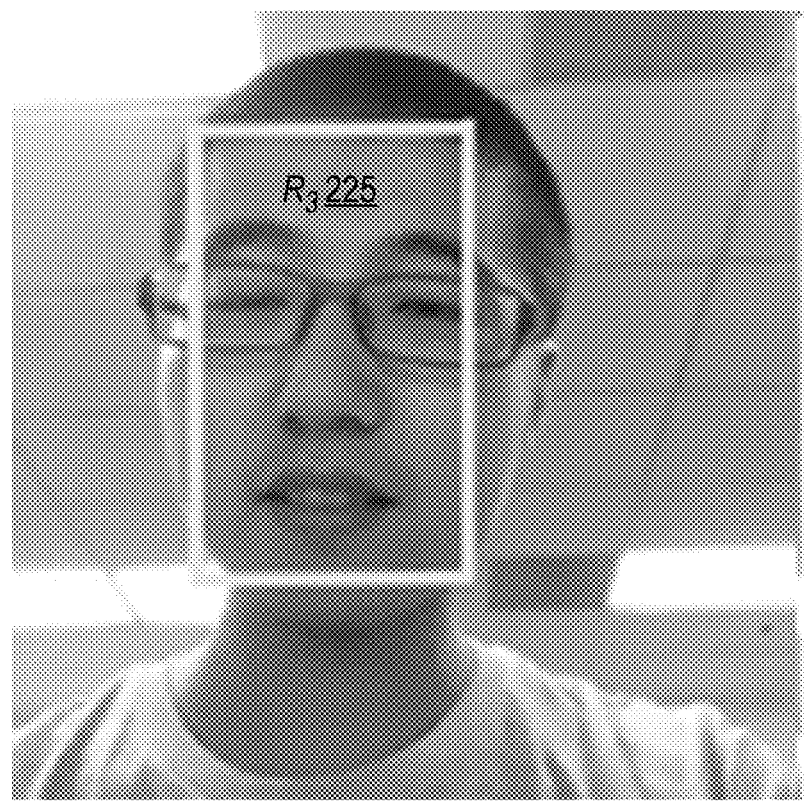
FIG. 2(d) illustrates a third of the three most frequently used Regions of Interest (ROIs), denoted by R3, as may be utilized in embodiments of the invention.
Figure 5A:
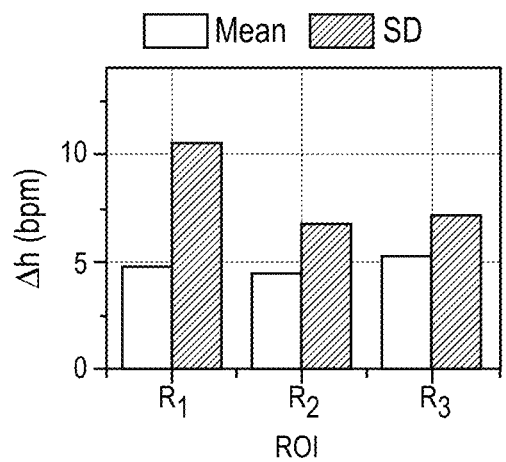
FIG. 5(a) shows the mean and SD of Δh in S.
Figure 5B:
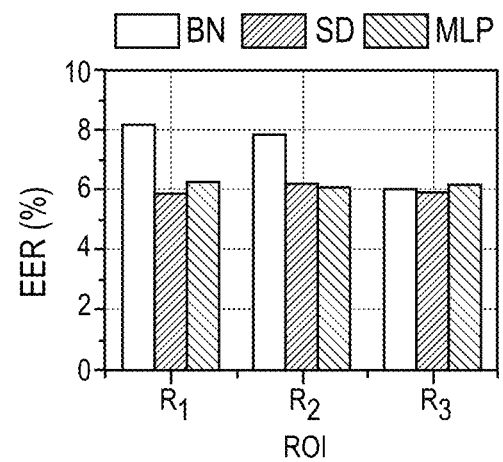
FIG. 5(b) shows the impact of ROI on EER.

FIG. 2(b), FIG. 2(c), and FIG. 2(d) illustrate the three ROIs to study. FIG. 5(a) shows the mean and SD of $\Delta h$ in $S_p$. As can be seen, the means of $\Delta h$ using $R_1$ 215, $R_2$ 220, and $R_3$ 225 are 4.84, 4.56, and 5.32 bpm, respectively, and the SDs are 10.55, 6.73, and 7.19 bpm, respectively. FIG. 5(b) shows the corresponding EERs when $R_1$ 215, $R_2$ 220, and $R_3$ 225 are used as the selected ROI, respectively. The EERs with $R_1$ 215 using BN, LR, and MLP are 8.2%, 5.9%, and 6.3%, respectively, those with $R_2$ 220 are 7.9%, 6.2%, and 6.1%, respectively, and those with $R_3$ 225 are 6.0%, 6.0%, and 6.2%, respectively.

The results above show that the three ROIs lead to similar EER performance while the EERs with $R_3$ 225 are slightly better than those with $R_1$ 215 or $R_2$ 220. More importantly, the computation time according to embodiments of the invention using $R_3$ 225 as the selected ROI is much shorter than that using $R_1$ 215 or $R_2$ 220, as shown soon in Section IV-D6. Therefore, embodiments of the invention select $R_3$ 225 as the ROI for photoplethysmogram extraction by default.

3) Type-I Attack

FIG. 6(a) and FIG. 6(b) show the Receiver operating characteristic (ROC) curve and EER of embodiments of the invention, respectively. The true positive rates (TPRs) using BN, LR, and MLP are 90.2%, 97.5%, and 94.6%, respectively, the false positive rates (FPRs) are 3.8%, 5.2%, and 4.6%, respectively, and the EERs are 6.03%, 5.98%, and 6.21%, respectively. The results show that the performance of embodiments of the invention is similar to those of the prior art systems. To sum up, embodiments of the invention can achieve very high TPR and very low FPR at the same time, meaning that the embodiments can correctly distinguish between legitimate requests and VPAs with high probability.

FIG. 7 shows the EERs of embodiments of the invention in different user conditions. The EERs using BN, LR, and MLP under the rest condition are 7.70%, 5.57%, and 5.40%, respectively, those under the reading condition are 8.77%, 5.53%, 5.73%, respectively, and those under the gaming condition are 8.27%, 8.54%, and 5.65%, respectively. Overall, the EERs in the three user conditions are low, so embodiments of the invention can be used even when the user's cardiac activity changes. In addition, the EERs in the gaming condition are slightly higher than those under the other conditions. This is anticipated because the heart rate in the gaming condition is usually higher than others so that the SNR of the extracted photoplethysmogram usually decreases due to the increased noise level in the higher frequency range. Therefore, the consistency between the two photoplethysmograms from a pair of face and fingertip videos in the same authentication session drops, leading to a higher EER. Based on S, embodiments of the invention obtain the corresponding classifiers with BN, LR, and MLP, respectively, by using 10-fold cross validation for training. Then embodiments of the invention use the trained classifier models for testing the following.

4) Type-II Attack

Figure 8:
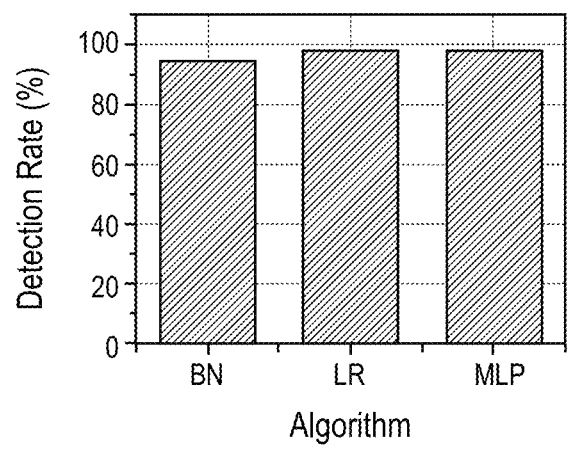
FIG. 8 depicts the detection rates using BN, LR and MLP.

Embodiments of the invention as tested first obtained the negative (adversarial) instances for the Type-II attack as follows. Two of the 18 participants acted as the adversaries. For each adversary, the other 17 participants were regarded as her/his victims. For each victim, embodiments of the invention randomly selected 10 face videos from her/his recordings. Then the two adversaries launched the Type-II attack, resulting in 2×10×17=340 negative instances. After that, embodiments of the invention applied the trained classifiers in Section IV-D3 to the collected negative instances and obtained the detection rate. As shown in FIG. 8, the detection rates using BN, LR, and MLP are 94.71%, 97.94%, and 98.24%, respectively, indicating that embodiments of the invention can detect VFA with overwhelming probability.

5) Robustness of Embodiments of the Invention

Head Pose.

Figure 9:
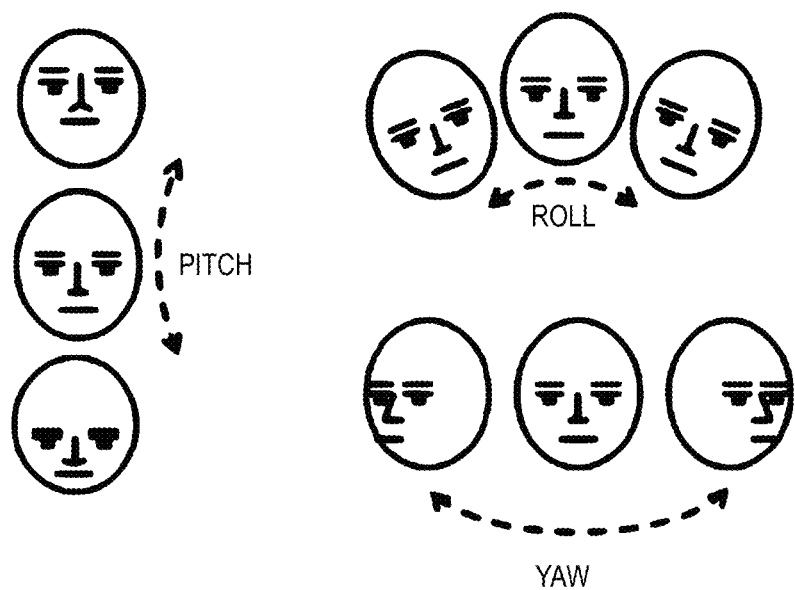
FIG. 9 illustrates the relative rotation of a user's head to the front head pose can be described by rotation angles in three independent axes, which are yaw, pitch, and roll, respectively.

The impact of head pose on the acceptance rate of embodiments of the invention were first studied. As illustrated in FIG. 9, the relative rotation of a user's head to the front head pose can be described by rotation angles in three independent axes, which are yaw, pitch, and roll, respectively. Hereafter embodiments of the invention also refer to the rotation angles in yaw, pitch, and roll axes as yaw, pitch, and roll, respectively. For the front head pose, yaw, pitch, and roll are equal to zero. Roll is easier to adjust by the user, and a zero roll also benefits face detection. So participants in the experiments were asked to adjust their head poses such that the rolls are as near to zero as possible. As a result, embodiments of the invention only focus on the other two types of head rotation angles, i.e., yaw and pitch.

Data collection worked as follows. First, two participants were asked to record videos for authentication with different yaws or pitches. Specifically, they recorded videos when the yaws changed and the pitches remained near to zero and continued when the pitches changed and the yaws remained near to zero. After that, the trained classifiers discussed in Section IV-D3 were applied to the collected dataset and an acceptance rate obtained. Each participant recorded 50 videos for the same yaw or pitch, resulting in 1,000 videos in total.

Figure 10A:
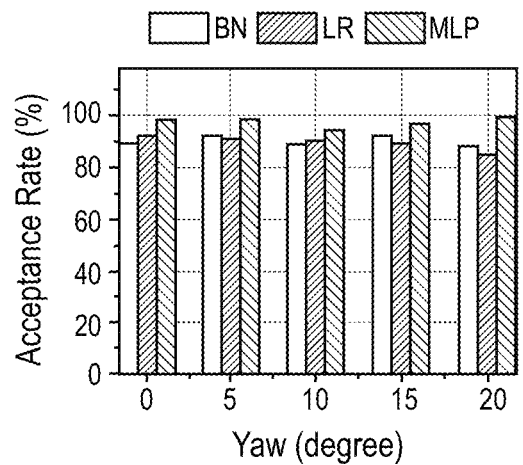
FIG. 10(a) shows the acceptance rates of embodiments of the invention with different yaws.
Figure 10B:
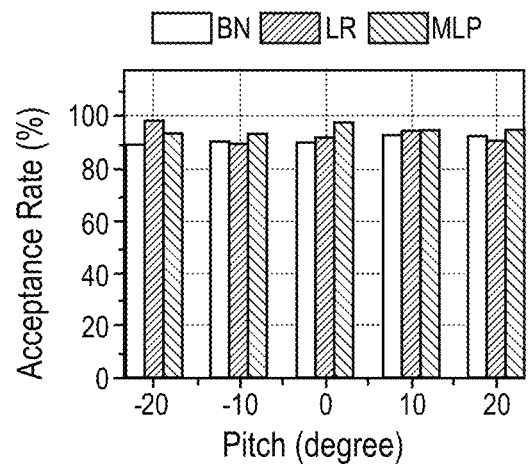
FIG. 10(b) shows the acceptance rates of embodiments of the invention with different pitches.

FIG. 10($a$) and FIG. 10($b$) show the acceptance rates of embodiments of the invention with different yaws and pitches, respectively. The acceptance rate is almost always higher than 90% and changes only slightly when the yaw of user head pose changes from zero to 20 degrees, or the pitch changes from −20 to 20 degrees. The results are as expected because embodiments of the invention are based on comparing two photoplethysmograms extracted from a pair of face and fingertip videos, and a small yaw or pitch (less than ±20 degrees) does not affect photoplethysmogram extraction much. Assuming that users tend to record videos with small yaws or pitches (less than ±10 degrees) in practice, it is believed that embodiments of the invention are robust to head pose changes.

Illumination.

Figure 11A:
FIG. 11(a) illustrates the clear influence of normal illuminations on video recording.
Figure 11B:
FIG. 11(b) illustrates the clear influence of low illuminations on video recording.

The impact of illumination on the acceptance rate of embodiments of the invention was studied. For this experiment, two participants were asked to record videos for authentication under two different illuminations, i.e., normal (in the range of hundreds lux) and low illuminations (less than 20 lux). FIG. 11($a$) and FIG. 11($b$) illustrate the clear influence of normal and low illuminations on video recording. The illumination was adjusted by turning off some of the lights in the office. After that, the trained classifiers described in Section IV-D3 were applied to the collected dataset and the acceptance rate obtained. Each participant recorded 50 videos for the same illumination, resulting in 200 videos in total for this experiment.

Figure 12A:
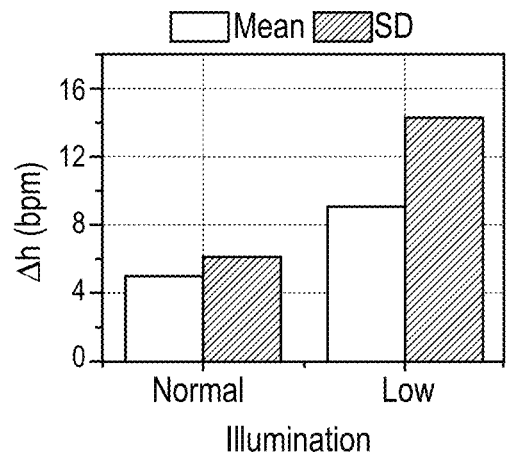
FIG. 12(a) illustrates the mean and SD of Δh.
Figure 12B:
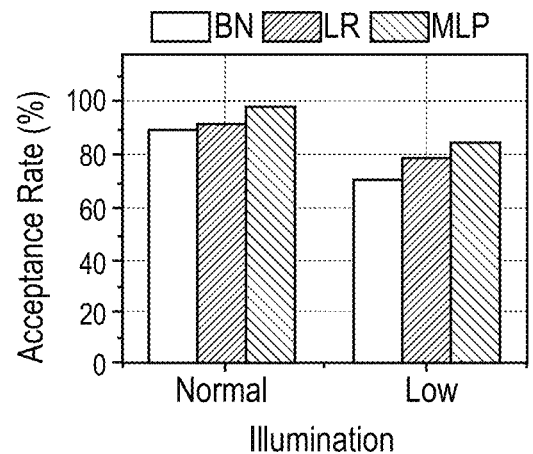
FIG. 12(b) illustrates the acceptance rate of embodiments of the invention.

FIG. 12($a$) and FIG. 12($b$) show the mean and SD of $\Delta h$ and acceptance rate of embodiments of the invention, respectively. The mean and SD of $\Delta h$ increase from 4.88 and 6.14 bpm to 9.07 and 14.34 bpm, respectively, when the illumination switches from normal to low. Correspondingly, the acceptance rates using BN, LR, and MLP drop from 90%, 92%, and 98% to 70%, 79%, and 85%, respectively. The results indicate that embodiments of the invention are greatly affected by illumination in the environment, which can be explained as follows. Embodiments of the invention rely on comparing the photoplethysmograms extracted from a pair of face and fingertip videos, and low illumination leads to a low SNR of the extracted photoplethysmogram. Hence, the consistency between the face and fingertip photoplethysmograms reduces (partially illustrated by the increased $\Delta h$), leading to the decreased acceptance rate.

Location.

The impact of locations on the acceptance rate of embodiments of the invention was also studied. First, two participants were asked to record videos for authentication in four different locations, i.e., the office, the apartments (APTs) of the participants, the university library (LIB), and an outdoor bench on the campus. After that, the trained classifiers described in Section IV-D3 were applied to the collected dataset and obtained the acceptance rate. Each participant recorded 50 videos for the same location, resulting in a dataset of 400 videos in total.

Figure 13:
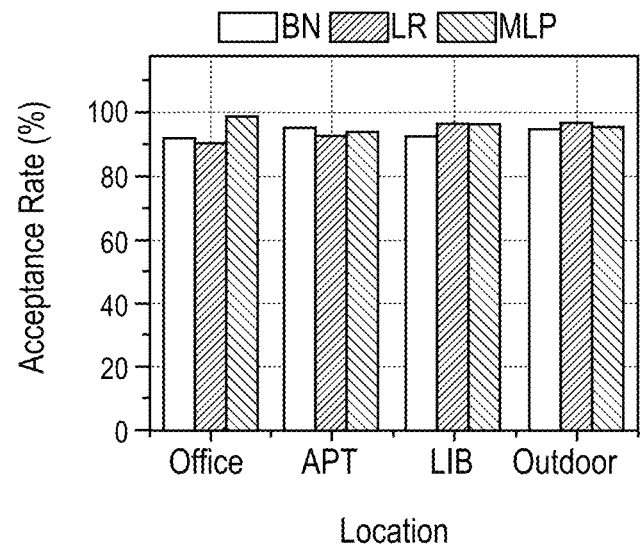
FIG. 13 shows the acceptance rate of embodiments of the invention with different locations.

FIG. 13 shows the acceptance rate of embodiments of the invention with different locations. The acceptance rates are always higher than 90% and do not change much when the location changes. The results indicate that embodiments of the invention are robust to location changes and thus can be used in different locations. The reason is that locations have little impact on photoplethysmogram extraction and consequently little impact on the classification results.

6) Computation Time

Figure 14A:
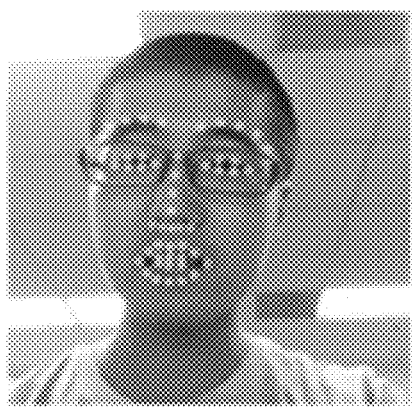
FIG. 14(a) depicts the tracked 49 landmarks on the user face which are used for the calculation of R1 and R2.
Figure 14B:
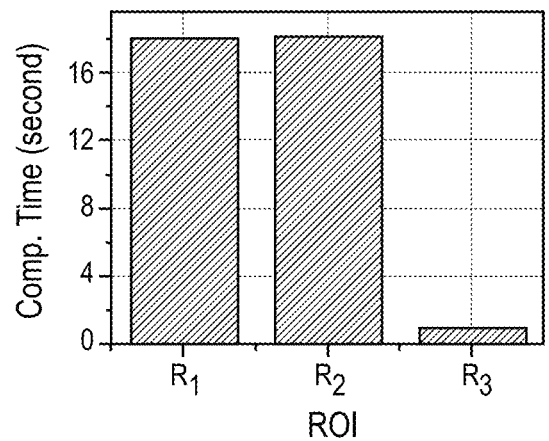
FIG. 14(b) shows the computation time using R1 or R2 or R3 as the selected ROI.

For this experiment, 100 pairs of face and fingertip videos were randomly selected from collected data. Each pair of videos were both chopped to a length of four seconds. Then experiments were performed with the given video pairs and the average computation time was obtained. To use $R_1$ 215 or $R_2$ 220, embodiments of the invention first used a face tracker to track the facial landmarks in each frame and then calculated the coordinates of $R_1$ or $R_2$. FIG. 14($a$) depicts the tracked 49 landmarks on the user face which are used for the calculation of $R_1$ and $R_2$.

FIG. 14($b$) shows the computation time using $R_1$ or $R_2$ or $R_3$ as the selected ROI. The average computation time using $R_1$, $R_2$, and $R_3$ are 18.05, 18.19, and 0.96 seconds, respectively. Therefore, selecting $R_3$ 225 as the ROI for photoplethysmogram extraction is much faster than selecting $R_1$ or $R_2$. Such results are as expected because $R_1$ and $R_2$ require much more computationally-expensive face trackers than that used by $R_3$.

The computation time of embodiments of the invention is comparable to the prior art. Given the video length of four seconds used in the evaluations, it is believed that the computation time of embodiments of the invention is similar to the prior art, but embodiments of the invention are more secure and user-friendly.

V. Discussion

In this section, alternative embodiments of the invention are discussed.

A. Authentication Time

In embodiments of the invention, the authentication time for liveness detection can be broken into two parts, i.e., video length and computation time. Given a video length of, for example, four seconds and the computation time of 0.96 seconds with $R_3$ 225 as the ROI, the total authentication time according to embodiments of the invention is around 4.96 seconds.

The authentication time according to embodiments of the invention is dominated by the video length, which is four seconds in one embodiment. A shorter video length may be adopted, however, at the cost of higher EERs. One way to shorten the required video length is to extract new features from extracted photoplethysmograms, for example, heart rate variability and the absolute delay between the two photoplethysmograms from face and fingertip videos. These two features can be useful when the SNRs of the two photoplethysmograms are sufficiently high.

VI. Computing Environment

Figure 15:
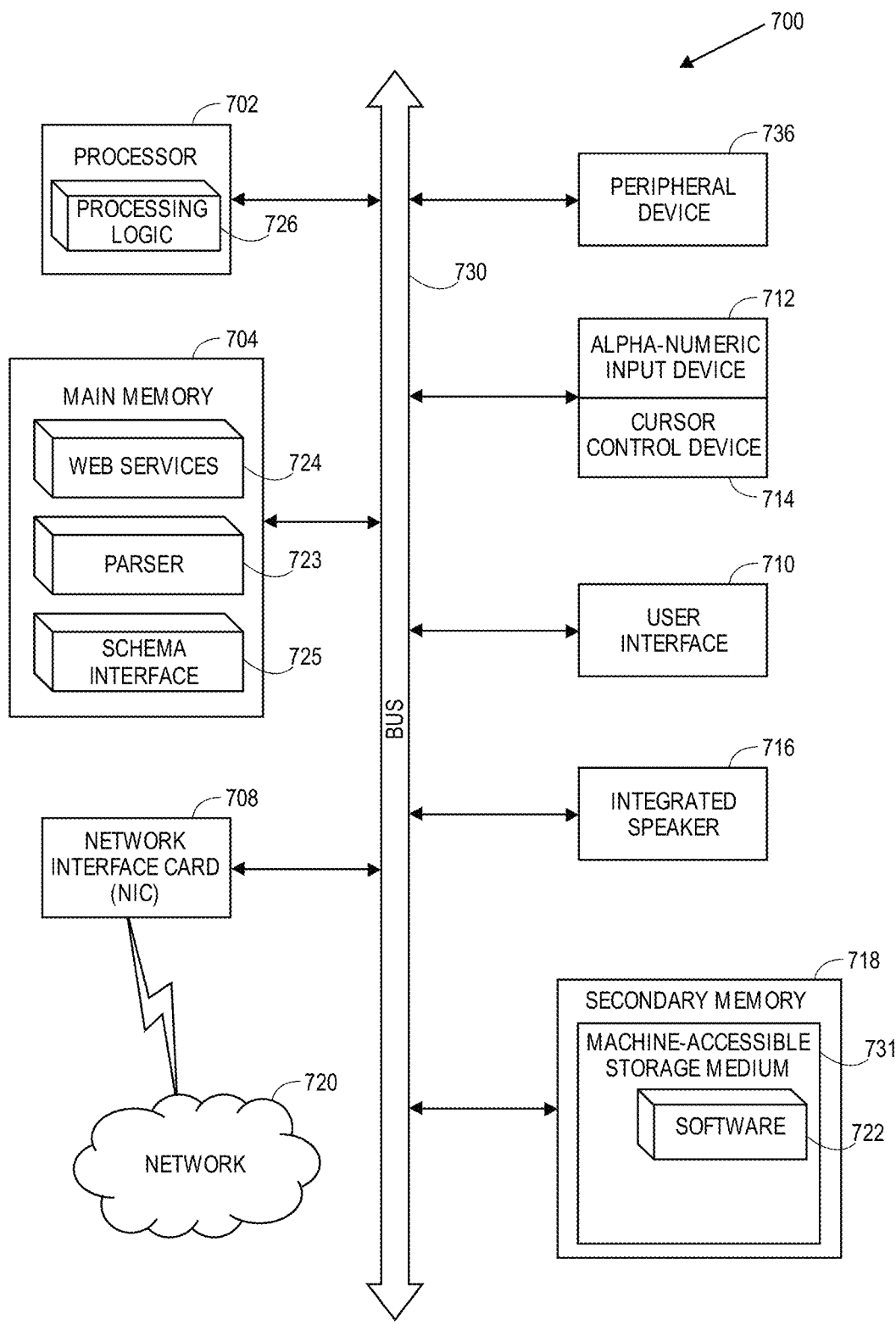
FIG. 15 illustrates a block diagram of a computing environment in and via which an embodiment of the invention may operate.

FIG. 15 illustrates a diagrammatic representation of a machine 700 in the exemplary form of a computer system, in accordance with one embodiment, within which a set of instructions, for causing the machine 700 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer to peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), etc.), and a secondary memory 718, which communicate with each other via a bus 730. Main memory 704 includes information and instructions and software program components necessary for performing and executing the functions with respect to the various embodiments of the systems, methods for implementing embodiments of the invention described herein. Instructions 723 may be stored within main memory 704. Main memory 704 and its sub-elements are operable in conjunction with processing logic 726 and/or software 722 and processor 702 to perform the methodologies discussed herein.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and functionality which are discussed herein.

The computer system 700 may further include one or more network interface cards 708 to interface with the computer system 700 with one or more networks 720. The computer system 700 also may include a user interface 710 (such as a video display unit, a liquid crystal display (LCD), or a cathode ray tube (CRT)), an alphanumeric input device 712 (e.g., a keyboard), a cursor control device 714 (e.g., a mouse), and a signal generation device 716 (e.g., an integrated speaker). The computer system 700 may further include peripheral device 736 (e.g., wireless or wired communication devices, memory devices, storage devices, audio processing devices, video processing devices, etc.).

The secondary memory 718 may include a non-transitory machine-readable storage medium (or more specifically a non-transitory machine-accessible storage medium) 731 on which is stored one or more sets of instructions (e.g., software 722) embodying any one or more of the methodologies or functions described herein. Software 722 may also reside, or alternatively reside within main memory 704, and may further reside completely or at least partially within the processor 702 during execution thereof by the computer system 700, the main memory 704 and the processor 702 also constituting machine-readable storage media. The software 722 may further be transmitted or received over a network 720 via the network interface card 708.

Some portions of this detailed description are presented in terms of algorithms and representations of operations on data within a computer memory. These algorithmic descriptions and representations are the means used by those skilled in the data processing arts to most effectively convey the substance of their work to others skilled in the art. An algorithm is here, and generally, conceived to be a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from this discussion, it is appreciated that throughout the description, discussions utilizing terms such as "processing" or "computing" or "calculating" or "determining" or "displaying" or the like, refer to the action and processes of a computer system or computing platform, or similar electronic computing device(s), that manipulates and transforms data represented as physical (electronic) quantities within the computer system's registers and memories into other data similarly represented as physical quantities within the computer system memories or registers or other such information storage, transmission or display devices.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments of invention also relate to apparatuses for performing the operations herein. Some apparatuses may be specially constructed for the required purposes, or may comprise a general purpose computer(s) selectively activated or configured by a computer program stored in the computer(s). Such a computer program may be stored in a computer readable storage medium, such as, but not limited to, any type of disk including optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms presented herein are not inherently related to any particular computer or other apparatus. Various general purpose systems may be used with programs in accordance with the teachings herein, or it may prove convenient to construct more specialized apparatus to perform the required methods. The structure for a variety of these systems appears from the description herein. In addition, embodiments of the invention are not described with reference to any particular programming language. It will be appreciated that a variety of programming languages may be used to implement the embodiments of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices, etc.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims that follow. Features of the disclosed embodiments can be combined and rearranged in various ways.

VII. Conclusion

Embodiments of the invention provide a novel and practical scheme for liveness detection to secure face authentication on COTS mobile devices. The embodiments rely on the nonforgeability of the photoplethysmograms, for example, extracted from two videos taken through the one or more cameras on a mobile device. Extensive user experiments confirmed that embodiments of the invention can effectively thwart photo-based and video-based forgery attacks on mobile face authentication systems.

The invention claimed is:
1. A system comprising:
a memory to store instructions;
a set of one or more processors to execute instructions;
a non-transitory machine-readable storage medium that provides instructions that, when executed by the set of one or more processors, the instructions stored in the memory are configurable to cause the system to perform operations comprising:
receiving an image of an authorized user's face for use with performing subsequent user authentication and granting access to a computing device or granting to access a software application executing on the computing device;
storing the image of the authorized user's face as a stored image within a storage device accessible to the system for later retrieval when performing the subsequent user authentication;
receiving real-time video of a user attempting authentication to access the computing device, the real-time video including at least a face of the user and a finger-tip of the user;
performing a first comparison by comparing the face of the user attempting authentication to access the computing device taken from the real-time video with the stored image of the authorized user's face previously stored to the storage device accessible to the system to determine if the face of the user attempting authentication matches the authorized user's face;
extracting a first photoplethysmography (PPG) measurement from the real-time video of the face ($P_{face}$) of the user attempting authentication to access the computing device;
extracting a second photoplethysmography (PPG) measurement from the real-time video of the finger-tip ($P_{ftip}$) of the user attempting authentication to access the computing device;
performing a second comparison by comparing the first photoplethysmography (PPG) measurement of the face of the user with the second photoplethysmography (PPG) measurement of the finger-tip of the user to determine if the first and second photoplethysmography measurements were both taken from a same live user captured within the real-time video using a calculated feature vector for use in classifying the first and second photoplethysmography (PPG) measurements as passing a liveness test or failing a liveness test by the following sub-operations:
calculating a maximum cross correlation between the $P_{face}$ and $P_{ftip}$ by first determining an optimal alignment between $P_{face}$ and $P_{ftip}$ to derive aligned values $\dot{P}_{face}$ and $\dot{P}_{ftip}$ for the first and second photoplethysmography (PPG) measurements;
calculating an amplitude ratio between the first and second photoplethysmography (PPG) measurements using the aligned values $\dot{P}_{face}$ and $\dot{P}_{ftip}$ from which each of mean, minimum, maximum, and standard deviation of the amplitude ratio are determined as features (R), represented by the terms $R_{mean}$, $R_{min}$, $R_{max}$, and $R_{SD}$, respectively, wherein R is a ratio vector between the first and second photoplethysmography (PPG) measurements; and
performing liveness detection for the user attempting authentication to access the computing device by inputting the feature vector calculated into a trained classifier to determine if the liveness detection is a pass or a fail; and
granting access to the user attempting authentication to access the computing device based on successfully authenticating the user as the authorized user pursuant to the first comparison determined to match the authorized user's face and based further on the trained classifier determining the liveness for the first and second photoplethysmography (PPG) measurements using the feature vector calculated was a pass.

2. The system of claim 1, wherein receiving the first and second PPGs respectively obtained from the face of the user and the finger-tip of the user comprises receiving the first and second PPGs respectively obtained from one of: a PPG sensor, a video camera, and a video camera with a light source, positioned adjacent the face of the user and the finger-tip of the user.

3. The system of claim 1, wherein receiving the first PPG obtained from the face of the user attempting to access the device comprises:
  selecting a region of interest (ROI) in the image of the face of the user attempting to access the device; and
  extracting the first PPG from the selected ROI.

4. The system of claim 3, wherein extracting the first PPG from the selected ROI comprises extracting the first PPG by averaging all pixel values in the selected ROI.

5. The system of claim 3, wherein the one or more digital images or frames of video of the face of the user attempting to access the device received from the first video camera comprise a red channel, a blue channel, and a green channel; and
  wherein extracting the first PPG from the selected ROI comprises extracting from only the green channel the first PPG from the selected ROI.

6. The system of claim 3, wherein the system is further configured for:
  filtering the extracted first PPG to remove illumination interference and to remove out-of-band noise.

7. The system of claim 1,
  wherein receiving the second PPG obtained from the finger-tip of the user attempting to access the device comprises:
  receiving from a second video camera one or more digital images or frames of video, hereafter "the second image", of a fingertip of the user attempting to access the device; and extracting the second PPG from the second image.

8. The system of claim 7,
  wherein authenticating the user attempting to access the computing device or the software application executing thereon comprises authenticating the user attempting to access a mobile computing device or a software application thereon, and wherein the first video camera is a front-facing camera on the mobile computing device and the second video camera is a rear-facing video camera on the mobile computing device.

9. The system of claim 7,
  wherein receiving from the second video camera the second image of the fingertip of the user attempting to access the device comprises receiving from the second video camera the second image of the fingertip of the user attempting to access the device simultaneously with, concurrently with, or within a system-configured period of time after, receiving from the first video camera the image of the face of the user attempting to access the device.

10. A method performed by a system having at least a processor and a memory therein, wherein the method comprises:
  receiving an image of an authorized user's face for use with performing subsequent user authentication and granting access to a computing device or granting to access a software application executing on the computing device;
  storing the image of the authorized user's face as a stored image within a storage device accessible to the system for later retrieval when performing the subsequent user authentication;
  receiving real-time video of a user attempting authentication to access the computing device, the real-time video including at least a face of the user and a finger-tip of the user;
  performing a first comparison by comparing the face of the user attempting authentication to access the computing device taken from the real-time video with the stored image of the authorized user's face previously stored to the storage device accessible to the system to determine if the face of the user attempting authentication matches the authorized user's face;
  extracting a first photoplethysmography (PPG) measurement from the real-time video of the face ($P_{face}$) of the user attempting authentication to access the computing device;
  extracting a second photoplethysmography (PPG) measurement from the real-time video of the finger-tip ($P_{ftip}$) of the user attempting authentication to access the computing device;
  performing a second comparison by comparing the first photoplethysmography (PPG) measurement of the face of the user with the second photoplethysmography (PPG) measurement of the finger-tip of the user to determine if the first and second photoplethysmography measurements were both taken from a same live user captured within the real-time video using a calculated feature vector for use in classifying the first and second photoplethysmography (PPG) measurements as passing a liveness test or failing a liveness test by the following sub-operations:
  calculating a maximum cross correlation between the $P_{face}$ and $P_{ftip}$ by first determining an optimal alignment between $P_{face}$ and $P_{ftip}$ to derive aligned values $\dot{P}_{face}$ and $\dot{P}_{ftip}$ for the first and second photoplethysmography (PPG) measurements;
  calculating an amplitude ratio between the first and second photoplethysmography (PPG) measurements using the aligned values $\dot{P}_{face}$ and $\dot{P}_{ftip}$ from which each of mean, minimum, maximum, and standard deviation of the amplitude ratio are determined as features (R), represented by the terms $R_{mean}$, $R_{min}$, $R_{max}$, and $R_{SD}$, respectively, wherein R is a ratio vector between the first and second photoplethysmography (PPG) measurements; and
  performing liveness detection for the user attempting authentication to access the computing device by inputting the feature vector calculated into a trained classifier to determine if the liveness detection is a pass or a fail; and
  granting access to the user attempting authentication to access the computing device based on successfully authenticating the user as the authorized user pursuant to the first comparison determined to match the authorized user's face and based further on the trained classifier determining the liveness for the first and second photoplethysmography (PPG) measurements using the feature vector calculated was a pass.

11. The method of claim 10, wherein receiving the first and second PPGs respectively obtained from the face of the user and the finger-tip of the user comprises receiving the first and second PPGs respectively obtained from one of: a PPG sensor, a video camera, and a video camera with a light source, positioned adjacent the face of the user and the finger-tip of the user.

12. The method of claim 10, wherein receiving the first PPG obtained from the face of the user attempting to access the device comprises:

selecting a region of interest (ROI) in the image of the face of the user attempting to access the device; and extracting the first PPG from the selected ROI.

13. The method of claim 12, wherein extracting the first PPG from the selected ROI comprises extracting the first PPG by averaging all pixel values in the selected ROI.

14. The method of claim 12, wherein the one or more digital images or frames of video of the face of the user attempting to access the device received from the first video camera comprise a red channel, a blue channel, and a green channel; and
wherein extracting the first PPG from the selected ROI comprises extracting from only the green channel the first PPG from the selected ROI.

15. The method of claim 12, further comprising filtering the extracted first PPG to remove illumination interference and to remove out-of-band noise.

16. The method of claim 12,
wherein receiving the second PPG obtained from the finger-tip of the user attempting to access the device comprises:
receiving from a second video camera one or more digital images or frames of video, hereafter "the second image", of a fingertip of the user attempting to access the device; and extracting the second PPG from the second image;
wherein authenticating the user attempting to access the computing device or the software application executing thereon comprises authenticating the user attempting to access a mobile computing device or a software application thereon, and wherein the first video camera is a front-facing camera on the mobile computing device and the second video camera is a rear-facing video camera on the mobile computing device; and
wherein receiving from the second video camera the second image of the fingertip of the user attempting to access the device comprises receiving from the second video camera the second image of the fingertip of the user attempting to access the device simultaneously with, concurrently with, or within a system-configured period of time after, receiving from the first video camera the image of the face of the user attempting to access the device.

17. The system of claim 1:
wherein receiving the real-time video of the user attempting authentication includes receiving real-time video of the user's face via a front facing camera of the computing device and receiving real-time video of a finger-tip via a secondary camera of the computing device.

18. The system of claim 1:
wherein receiving the real-time video of the user attempting authentication comprises receiving real-time video of the user's face via a front facing camera of the computing device and receiving real-time video of a finger-tip via a secondary camera of the computing device.

19. Non-transitory computer-readable storage media having instructions store thereupon that, when executed by a system having at least a processor and a memory, therein, the instructions cause the system to perform operations including:
receiving an image of an authorized user's face for use with performing subsequent user authentication and granting access to a computing device or granting to access a software application executing on the computing device;
storing the image of the authorized user's face as a stored image within a storage device accessible to the system for later retrieval when performing the subsequent user authentication;
receiving real-time video of a user attempting authentication to access the computing device, the real-time video including at least a face of the user and a finger-tip of the user;
performing a first comparison by comparing the face of the user attempting authentication to access the computing device taken from the real-time video with the stored image of the authorized user's face previously stored to the storage device accessible to the system to determine if the face of the user attempting authentication matches the authorized user's face;
extracting a first photoplethysmography (PPG) measurement from the real-time video of the face ($P_{face}$) of the user attempting authentication to access the computing device;
extracting a second photoplethysmography (PPG) measurement from the real-time video of the finger-tip ($P_{ftip}$) of the user attempting authentication to access the computing device;
performing a second comparison by comparing the first photoplethysmography (PPG) measurement of the face of the user with the second photoplethysmography (PPG) measurement of the finger-tip of the user to determine if the first and second photoplethysmography measurements were both taken from a same live user captured within the real-time video using a calculated feature vector for use in classifying the first and second photoplethysmography (PPG) measurements as passing a liveness test or failing a liveness test by the following sub-operations:
calculating a maximum cross correlation between the $P_{face}$ and $P_{ftip}$ by first determining an optimal alignment between $P_{face}$ and $P_{ftip}$ to derive aligned values $\acute{P}_{face}$ and $\acute{P}_{ftip}$ for the first and second photoplethysmography (PPG) measurements;
calculating an amplitude ratio between the first and second photoplethysmography (PPG) measurements using the aligned values $\acute{P}_{face}$ and $\acute{P}_{ftip}$ from which each of mean, minimum, maximum, and standard deviation of the amplitude ratio are determined as features (R), represented by the terms $R_{mean}$, $R_{min}$, $R_{max}$, and $R_{SD}$, respectively, wherein R is a ratio vector between the first and second photoplethysmography (PPG) measurements; and
performing liveness detection for the user attempting authentication to access the computing device by inputting the feature vector calculated into a trained classifier to determine if the liveness detection is a pass or a fail; and
granting access to the user attempting authentication to access the computing device based on successfully authenticating the user as the authorized user pursuant to the first comparison determined to match the authorized user's face and based further on the trained classifier determining the liveness for the first and second photoplethysmography (PPG) measurements using the feature vector calculated was a pass.

20. The non-transitory computer readable storage media of claim 19, wherein the instructions cause the system to perform operations further comprising:
receiving the first PPG obtained from the face of the user attempting to access the device comprises:

selecting a region of interest (ROI) in the image of the face of the user attempting to access the device; and
extracting the first PPG from the selected ROI.

\* \* \* \* \*